US009434273B2

(12) United States Patent
Okamura et al.

(10) Patent No.: US 9,434,273 B2
(45) Date of Patent: Sep. 6, 2016

(54) ELECTRICAL SOURCE CONTROL APPARATUS

(71) Applicant: TOYOTA JIDOSHA KABUSHIKI KAISHA, Toyota-shi (JP)

(72) Inventors: Masaki Okamura, Toyota (JP); Naoyoshi Takamatsu, Sunto-gun (JP); Takaji Umeno, Nagakute (JP); Shuji Tomura, Nagakute (JP); Masanori Ishigaki, Nagakute (JP); Naoki Yanagizawa, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/778,794

(22) PCT Filed: Mar. 19, 2014

(86) PCT No.: PCT/JP2014/057559
§ 371 (c)(1),
(2) Date: Sep. 21, 2015

(87) PCT Pub. No.: WO2014/148558
PCT Pub. Date: Sep. 25, 2014

(65) Prior Publication Data
US 2016/0039307 A1 Feb. 11, 2016

(30) Foreign Application Priority Data

Mar. 22, 2013 (JP) .................................. 2013-059647

(51) Int. Cl.
*B60L 11/18* (2006.01)
*B60L 3/00* (2006.01)
(Continued)

(52) U.S. Cl.
CPC .......... *B60L 11/1868* (2013.01); *B60L 3/0046* (2013.01); *B60L 7/14* (2013.01);
(Continued)

(58) Field of Classification Search
CPC ........ B60W 20/00; B60W 10/08; B60K 1/02
See application file for complete search history.

(56) References Cited

U.S. PATENT DOCUMENTS

| 7,607,503 B1* | 10/2009 | Schechter | ................ B60K 6/12 |
| | | | 123/255 |
| 2007/0275807 A1* | 11/2007 | Bucknor | ................ B60K 6/365 |
| | | | 475/5 |

(Continued)

FOREIGN PATENT DOCUMENTS

| JP | 5 30608 | 2/1993 |
| JP | 7 95701 | 4/1995 |

(Continued)

OTHER PUBLICATIONS

International Search Report Issued Jun. 24, 2014 in PCT/JP14/057559 Filed Mar. 19, 2014.

*Primary Examiner* — Thomas Tarcza
*Assistant Examiner* — Alex C Dunn
(74) *Attorney, Agent, or Firm* — Oblon, McClelland, Maier & Neustadt, L.L.P.

(57) ABSTRACT

An electrical source control apparatus controls a vehicle traveling by using a source system including a first source performing input/output of first power and a second source performing input/output of second power, capacity of the second source is smaller than that of the first source and output of the second source is larger than that of the first source. The apparatus has a controller programmed to select a first driving mode which prioritizes a fuel efficiency over a driving performance and a second driving mode which prioritizes the driving performance over the fuel efficiency based on a characteristic required for the vehicle from driving modes having different ratios of the first power with respect to a required power required for the source system, and control the first and second sources such that the input/output of the first power is performed in accordance with the ratio of the selected driving mode.

16 Claims, 7 Drawing Sheets

(51) Int. Cl.
*B60L 7/14* (2006.01)
*B60L 7/18* (2006.01)
*B60L 11/00* (2006.01)
*H02J 7/00* (2006.01)
*B60W 20/00* (2016.01)

(52) U.S. Cl.
CPC .............. *B60L 7/18* (2013.01); *B60L 11/005* (2013.01); *B60L 11/18* (2013.01); *B60L 11/1803* (2013.01); *B60L 11/1859* (2013.01); *B60L 11/1861* (2013.01); *B60W 20/106* (2013.01); *H02J 7/00* (2013.01); *H02J 7/0065* (2013.01); *B60L 2210/10* (2013.01); *B60L 2240/12* (2013.01); *B60L 2240/525* (2013.01); *B60L 2240/545* (2013.01); *B60L 2240/547* (2013.01); *B60L 2240/549* (2013.01); *H02J 2007/0067* (2013.01); *Y02T 10/705* (2013.01); *Y02T 10/7005* (2013.01); *Y02T 10/7022* (2013.01); *Y02T 10/7044* (2013.01); *Y02T 10/7216* (2013.01); *Y10S 903/907* (2013.01)

(56) References Cited

U.S. PATENT DOCUMENTS

| | | | | |
|---|---|---|---|---|
| 2008/0015073 | A1* | 1/2008 | Raghavan | B60K 6/365 475/5 |
| 2008/0312021 | A1* | 12/2008 | Oba | B60K 6/365 475/5 |
| 2008/0318721 | A1* | 12/2008 | Oba | B60K 6/365 475/5 |
| 2010/0065349 | A1* | 3/2010 | Ichikawa | B60L 3/0046 180/65.1 |
| 2010/0116615 | A1* | 5/2010 | Oba | B60K 6/387 192/84.3 |
| 2011/0111910 | A1* | 5/2011 | Ideshio | B60K 6/36 475/5 |
| 2012/0109442 | A1* | 5/2012 | Kato | B60W 10/26 701/22 |

FOREIGN PATENT DOCUMENTS

| | | |
|---|---|---|
| JP | 7 245808 | 9/1995 |
| JP | 10-84601 A | 3/1998 |
| JP | 2010 41847 | 2/2010 |
| JP | 2011 182542 | 9/2011 |

\* cited by examiner

ELECTRICAL SOURCE CONTROL APPARATUS

TECHNICAL FIELD

The present invention relates to an electrical source control apparatus for controlling a vehicle which travels by using an electrical source system including two types of electrical sources, for example.

BACKGROUND ART

A vehicle (for example, an Electrical Vehicle or a Hybrid Vehicle) which has an electrical source system including two types of electrical sources is proposed (see Patent Literatures 1 and 2). An electrical source which is capable of discharging (namely, outputting) a constant electrical power over a long time and an electrical source which is capable of performing a rapid discharge/charge (namely, output/input) are used as two types of electrical sources, for example.

Here, the Patent Literature 1 discloses a control method by which all of a required output for the discharge is satisfied by the output of a battery, if the required output for the discharge which is required for an electrical source apparatus is equal to or less than a maximum output of the battery in a power-running state. Moreover, the Patent Literature 1 discloses a control method by which the excess of the required output for the discharge which is more than the maximum output of the battery is satisfied by the output of a capacitor (alternatively, all of the required output for the discharge is satisfied by the output of the capacitor), if the required output for the discharge which is required for an electrical source apparatus is more than the maximum output of the battery. This control method prevents a rapid discharge from the battery and thus suppresses a deterioration of the battery.

Moreover, the Patent Literature 2 discloses a control method which increases a share (rate) of the charge to a large capacity type of condenser by restricting the charge to a battery, when a braking (a regeneration) is performed. This control method prevents a rapid charge to the battery and thus suppresses a deterioration of the battery.

CITATION LIST

Patent Literature

Patent Literature 1: Japanese Patent Application Laid Open No. Hei7-245808
Patent Literature 1: Japanese Patent Application Laid Open No. Hei5-30608

SUMMARY OF INVENTION

Technical Problem

However, the control method disclosed in the Patent Literature 1 or 2 allows the charge of the capacitor or the discharge of the capacitor only when the battery is charged or discharges rapidly, only for the purpose of preventing the deterioration of the battery. Thus, the control method disclosed in the Patent Literature 1 or 2 is not capable of effectively using the battery and the capacitor in accordance with characteristics which is required for the vehicle. For example, if the control method disclosed in the Patent Literature 1 or 2 pertinaciously prevents the deterioration of the battery, there is a possibility that a driving performance (traveling performance), a fuel efficiency or the like of the vehicle deteriorates. Alternatively, there is a possibility that the control method disclosed in the Patent Literature 1 or 2 may deteriorate any characteristics which is required for the vehicle (namely, may not satisfy (achieve or realize) a desired characteristics), other than the driving performance, the fuel efficiency or the like of the vehicle.

The subject to be solved by the present invention includes the above as one example. It is therefore an object of the present invention to provide an electrical source control apparatus which is capable of making the vehicle travel by using two types of electrical sources while satisfying different characteristics as occasion demands, even if the different characteristics are required for the vehicle having two types of electrical sources.

Solution to Problem (First Electrical Source Control Apparatus)
<1>
In order to solve the above described problem, a first electrical source control apparatus is an electrical source control apparatus for controlling a vehicle which travels by using an electrical source system including both of first and second electrical sources, the first electrical source performs an input/output of a first electrical power, the second electrical source performs an input/output of a second electrical power, a capacity of the second electrical source is smaller than that of the first electrical source and an output of the second electrical source is larger than that of the first electrical source, the electrical source control apparatus is provided with: a selecting device configured to select a desired driving mode on the basis of a characteristic which is required for the vehicle from a plurality of driving modes, each driving mode is associated with a ratio of the first electrical power with respect to a required electrical power which is required for the electrical source system and the ratios in the plurality of driving modes are different from each other; and a controlling device configured to control the first and second electrical sources such that the input/output of the first and second electrical powers are performed in accordance with the ratio of the selected driving mode.

The first electrical source control apparatus is capable of controlling the vehicle which travels by using the electrical source system including both of the first and second electrical sources.

The vehicle which travels by using the above described electrical source system typically travels by using an electrical power outputted from the electrical source system, when the vehicle is in a power-running state. Specifically, for example, the vehicle travels by using a driving power of a rotating electrical machine which operates by using the electrical power outputted from the electrical source system. As a result, one or both of the first and second electrical sources often outputs the electrical power (namely, discharges) when the vehicle is in the power-running state. On the other hand, the vehicle travels while inputting the electrical power into the electrical source system, when the vehicle is in a regeneration state. Specifically, for example, the vehicle travels while inputting the electrical power, which is generated by the regeneration of the rotating electrical machine, into the electrical source system. As a result, the electrical power is often inputted to (namely, charges) one or both of the first and second electrical sources when the vehicle is in the regeneration state.

Here, the first electrical source performs the input/output (charge/discharge) of the first electrical power. Especially, the first electrical source is an electrical source (what we call a high capacity type electrical source) whose capacity is larger than the capacity of the second electrical source. Therefore, the first electrical source is capable of outputting the constant electrical power over a longer time than the second electrical source. On the other hand, the second electrical source performs the input/output (charge/discharge) of the second electrical power. Especially, the second electrical source is an electrical source (what we call a high output (high power) type electrical source) whose output is larger than the output of the first electrical source. Therefore, the second electrical source is capable of performing the input/output of the electrical power more rapidly than the first electrical source.

Incidentally, a battery may be used as the first electrical source and a capacitor (in other words, a condenser) may be used as the second electrical source, for example. Alternatively, a high capacity type battery (namely, a battery whose capacity is larger than that of a high output type battery) may be used as the first electrical source and the high output type battery (namely, a battery whose output is larger than that of the high capacity type battery) may be used as the second electrical source, for example. Alternatively, a high capacity type capacitor (namely, a capacitor whose capacity is larger than that of a high output type capacitor) may be used as the first electrical source and the high output type capacitor (namely, a capacitor whose output is larger than that of the high capacity type capacitor) may be used as the second electrical source, for example.

In order to control the above described vehicle (in other words, the electrical source system which the above described vehicle is provided with), the first electrical source control apparatus is provided with the selecting device and the controlling device.

The selecting device selects the desired driving mode from the plurality of driving modes. The plurality of driving modes can be distinguished from each other on the basis of the ratio of the first electrical power with respect to the required electrical power (namely, a percentage (proportion) of the first electrical power to the required electrical power). For example, the plurality of driving modes may include a driving mode in which the ratio of the first electrical power is within a first range, a driving mode in which the ratio of the first electrical power is within a second range (however, at least one portion of the second range is different from the first range) and the like. Alternatively, for example, the plurality of driving modes may include a driving mode in which the ratio of the first electrical power is a first value, a driving mode in which the ratio of the first electrical power is a second value (however, the second value is different from the first value) and the like.

Incidentally, the required electrical power is an electrical power which is required for the electrical source system. Namely, the required electrical power corresponds to an electrical power which should be outputted from the electrical source system for the power-running of the vehicle, when the vehicle is in the power-running state. Alternatively, the required electrical power corresponds to an electrical power which should be inputted to the electrical source system (namely, the electrical power which is generated by the regeneration and which should be inputted to the electrical source system), when the vehicle is in the regeneration state.

Especially, the selecting device selects the desired driving mode on the basis of the characteristic which is required for the vehicle. For example, the selecting device may select the desired driving mode which is associated with the ratio of the first electrical power which is suitable for (alternatively, optimum for) the characteristic required for the vehicle. Alternatively, the selecting device may select the desired driving mode which is associated with the ratio of the first electrical power which satisfies (achieves or realizes) the characteristic required for the vehicle.

More specifically, for example, the selecting device may select the desired driving mode which is associated with the ratio of the first electrical power suitable for the characteristic which prioritizes a driving performance, if the characteristic required for the vehicle is the characteristic which prioritizes the driving performance over a fuel efficiently. Alternatively, the selecting device may select the desired driving mode which is associated with the ratio of the first electrical power suitable for the characteristic which prioritizes the fuel efficiency, if the characteristic required for the vehicle is the characteristic which prioritizes the fuel efficiency over the driving performance. Alternatively, the selecting device may select the desired driving mode which is associated with the ratio of the first electrical power suitable for another characteristic, if the characteristic required for the vehicle is another characteristic.

As described above, the selecting device is appropriately capable of selecting the desired driving mode every time the characteristic required for the vehicle varies along with the traveling of the vehicle. Namely, the selecting device is capable of appropriately varying the ratio of the first electrical power on the basis of the characteristic required for the vehicle, by appropriately selecting the desired driving mode.

Incidentally, if the ratio of the first electrical power is determined, a ratio of the second electrical power is also substantially determined. For example, if the electrical source system does not include another electrical source other than the first and second electrical sources, the ratio [%] of the second electrical power is equal to "100–the ratio of the first electrical source" [%]. Alternatively, if the electrical source system includes another electrical source other than the first and second electrical sources, the ratio [%] of the second electrical power is equal to "100–the ratio of the first electrical source–a ratio of the electrical power which is inputted to/outputted from another electrical source" [%].

The controlling device controls the first electrical source such that the input/output of the first electrical power is performed in accordance with the ratio which is associated with the desired driving mode selected by the selecting device. The controlling device similarly controls the second electrical source such that the input/output of the second electrical power is performed in accordance with the ratio which is associated with the desired driving mode selected by the selecting device. As a result, the first electrical source performs the input/output of the first electrical power which directly satisfies the ratio which is associated with the desired driving mode. Moreover, the second electrical source performs the input/output of the second electrical power which indirectly satisfies the ratio which is associated with the desired driving mode. Therefore, the first and second electrical sources can be effectively used in accordance with the ratio which is determined by the selecting device selecting the driving mode.

Incidentally, the controlling device may adjust (alternatively, determine) the ratio of the first electrical power on the basis of the desired driving mode which is selected by the selecting device. For example, the controlling device may adjust the ratio of the first electrical power within a range which is associated with the desired driving mode, if the desired driving mode is associated with the range of the ratio. Specifically, if one driving mode selected by the selecting device is associated with a first range of the ratio of the first electrical power, the controlling device may adjust the ratio of the first electrical power within the first range.

Here, the controlling device may adjust the ratio of the first electrical power on the basis of the characteristic required for the vehicle. Namely, the controlling device may adjust the ratio of the first electrical power within the range associated with one driving mode selected by the selecting device such that the ratio is equal to an appropriate (alternatively, optimum) ratio which can satisfy the characteristic required for the vehicle. More specifically, for example, the controlling device may adjust the ratio of the first electrical power on the basis of a relative relationship between the priority of the fuel efficiency and the priority of the driving performance. Alternatively, the controlling device may adjust the ratio of the first electrical power to prevent a depletion of the second electrical source whose capacity is relatively small. Alternatively, the controlling device may adjust the ratio of the first electrical power to actively use the second electrical source whose output is relatively large in accordance with a rapid increase or decrease of the required electrical power or the like.

As a result, the controlling device is capable of varying the ratio of the first electrical power, even if the selecting device continue to select the same driving mode as the desired driving mode (in other words, does not newly select another driving mode as the desired driving mode). Namely, the ratio of the first electrical power may be varied by the adjustment performed by the controlling device in addition to or instead of the selection of the driving mode performed by the selecting device.

As described above, the first electrical source control apparatus is capable of appropriately varying the ratio of the first electrical power. In other words, according to the first electrical source control apparatus, the ratio of the first electrical power is not necessarily fixed to constant ratio. Therefore, the first electrical source apparatus is capable of setting the ratio of the first electrical power to the appropriate (alternatively, optimum) ratio based on the variation of the characteristic or the like every time the characteristic required for the vehicle varies. As a result, the first electrical source control apparatus is capable of effectively using the first and second electrical sources in accordance with the ratio which is determined by the selection of the driving mode performed by the selecting device. Namely, the first electrical source control apparatus is capable of effectively using the first and second electrical sources in accordance with a first ratio which satisfies a first characteristic, if the characteristic required for the vehicle is the first characteristic. On the other hand, the first electrical source control apparatus is capable of effectively using the first and second electrical sources in accordance with a second ratio which satisfies a second characteristic, if the characteristic required for the vehicle is the second characteristic which is different from the first characteristic. As described above, the first electrical source control apparatus is capable of effectively using the first and second electrical sources to support the plurality of characteristics which are different from each other.

Incidentally, the control method disclosed in the above described Patent Literature 1 or 2 does not have a technical concept of varying the ratio of the first electrical power on the basis of the characteristic required for the vehicle. Namely, the control method disclosed in the above described Patent Literature 1 or 2 generally allows the ratio of the battery to be fixed to 100%. In addition, the control method disclosed in the above described Patent Literature 1 or 2 allows the capacitor to be charged or to discharge only when the battery is charged or discharges rapidly. Therefore, the control method disclosed in the above described Patent Literature 1 or 2 is merely capable of suppressing only the deterioration of the battery, and thus is difficult to effectively use the battery and the capacitor (namely, in accordance with the characteristic required for the vehicle) to support the plurality of characteristics which are different from each other. However, the first electrical source control apparatus is capable of varying the ratio of the first electrical power by allowing the selecting device to select the driving mode, and thus has an advantage of effectively using the first and second electrical sources (namely, in accordance with the characteristic required for the vehicle). Furthermore, the first electrical source control apparatus is capable of varying the ratio of the first electrical power within the range which is associated with the driving mode selected by the selecting device, and thus has an advantage of using the first and second electrical sources (namely, in accordance with the characteristic required for the vehicle) more effectively.

<2>

In another aspect of the first electrical source control apparatus, the plurality of driving modes include (i) a first driving mode in which the ratio of the first electrical power is less than a first threshold value and (ii) a second driving mode in which the ratio of the first electrical power is more than the first threshold value.

According to this aspect, the selecting device is capable of selecting either one of the first driving mode in which the ratio of the first electrical power is relatively small and the second driving mode in which the ratio of the first electrical power is relatively large on the basis of the characteristic required for the vehicle.

Incidentally, the first threshold value is preferably set to any value which is capable of appropriately distinguishing the first and second driving modes, which satisfy the different characteristics respectively, with considering the correlation between the characteristic required for the vehicle and the ratio of the first electrical power.

<3>

In another aspect of the first electrical source control apparatus, the plurality of driving modes include (i) a first driving mode in which the ratio of the first electrical power is less than a ratio of the second electrical power with respect to the required electrical power and (ii) a second driving mode in which the ratio of the first electrical power is more than the ratio of the second electrical power.

According to this aspect, the selecting device is capable of selecting either one of the first driving mode in which the ratio of the first electrical power is relatively small and the second driving mode in which the ratio of the first electrical power is relatively large on the basis of the characteristic required for the vehicle.

<4>

In another aspect of the first electrical source control apparatus in which the plurality of driving modes include the first and second driving modes, the selecting device selects the first driving mode, if the characteristic which is required for the vehicle is a characteristic which prioritizes a fuel efficiency over a driving performance, the selecting device selects the second driving mode, if the characteristic which is required for the vehicle is a characteristic which prioritizes the driving performance over the fuel efficiency.

According to this aspect, the selecting device selects the first driving mode in which the ratio of the first electrical power is relatively small, if the vehicle prioritizes the fuel efficiency (for example, an improvement of the fuel efficiency or the like) over the driving performance (for example, an improvement of a driving response). As a result, when the first driving mode is selected, the ratio of the first electrical power becomes smaller and the ratio of the second electrical power becomes larger, compared to the case where the second driving mode is selected. Here, an efficiency of the input/output of the second electrical power to/from the second electrical source is generally better than an efficiency of the input/output of the first electrical power to/from the first electrical source, because the capacity of the second electrical source is relatively small and the output of the second electrical source is relatively large. Thus, the fuel efficiency becomes better as the ratio of the second electrical power becomes larger (in other words, the ratio of the first electrical power becomes smaller). Thus, when the first driving mode is selected, the fuel efficiency of the vehicle improves, compared to the case where the second driving mode is selected.

On the other hand, the selecting device selects the second driving mode in which the ratio of the first electrical power is relatively large, if the vehicle prioritizes the driving performance over the fuel efficiency. As a result, when the second driving mode is selected, the ratio of the first electrical power becomes larger and the ratio of the second electrical power becomes smaller, compared to the case where the first driving mode is selected. In this case, the second electrical power which should be outputted from the second electrical source becomes relatively small, and thus the second electrical source is not likely depleted. In other words, the depletion of the second electrical source is prevented. As a result, the capacity of the second electrical source can be reduced compared to the case where the depletion of the second electrical source is not prevented, and thus a cost, a size or the like of the second electrical source can be reduced. Moreover, the required electrical power is preferably satisfied by a temporal output of the second electrical power from the second electrical source whose output is relatively large, when the large required electrical power is temporarily needed in order to satisfy a driving performance (for example, to allow the vehicle to accelerate at a relatively large acceleration rate). Thus, when the depletion of the second electrical source is prevented, the second electrical source is capable of temporarily outputting the second electrical power more easily to satisfy this driving performance. In other words, such a situation does not occur easily that the second electrical source is not capable of outputting the second electrical power at the timing when the second electrical source should temporarily output the second electrical power in accordance with the variation of the required electrical power. As a result, it is possible to satisfy a characteristic which prioritizes the driving performance for a longer time.

Incidentally, the selection according to this aspect is preferably performed when the vehicle is in the power-running state. On the other hand, the selecting device may perform the selection according to this aspect, when the vehicle is in the regeneration state. Alternatively, the selecting device may select the first driving mode in which the ratio of the second electrical power is relatively large, when the vehicle is in the regeneration state, regardless of whether the characteristic required for the vehicle is the characteristic which prioritizes the fuel efficiency over the driving performance or the characteristic which prioritizes the driving performance over the fuel efficiency. As a result, when the vehicle is in the regeneration state, the input of the second electrical power to the second electrical source (namely, the charge of the second electrical source performed by the electrical power which is generated by the regeneration) is prioritized.

<5>

In another aspect of the first electrical source control apparatus which selects the second driving mode if the characteristic which is required for the vehicle is the characteristic which prioritizes the driving performance over the fuel efficiency, the selecting device does not select the second driving mode, if a difference between a current value of the characteristic of at least one of the first and second electrical sources and a rated limit value of at least one of the first and second electrical sources is less than a second threshold value, even if the characteristic which is required for the vehicle is the characteristic which prioritizes the driving performance over the fuel efficiency.

According to this aspect, if the difference between the current value of the characteristic of the first electrical source and the rated limit value of the first electrical source is less than the second threshold value, there is a possibility that the first electrical source is not capable of performing a stable or desired operation. Namely, in this case, there is a possibility that the first electrical source is not capable of performing the input/output of the first electrical power which satisfies the driving performance. Similarly, if the difference between the current value of the characteristic of the second electrical source and the rated limit value of the second electrical source is less than the second threshold value, there is a possibility that the second electrical source is not capable of performing a stable or desired operation. Namely, in this case, there is a possibility that the second electrical source is not capable of performing the input/output of the second electrical power which satisfies the driving performance. Therefore, if there is a possibility that at least one of the first and second electrical sources is not capable of performing the stable or desired operation, the selecting device does not necessarily select the second driving mode which is associated with the ratio for prioritizing the driving performance, even if the characteristic which is required for the vehicle is the characteristic which prioritizes the driving performance over the fuel efficiency.

Incidentally, the "current value of the characteristic of the electrical source" means any parameter which is capable of directly or indirectly representing the current state (condition) of the electrical source. For example, a current temperature of the electrical source, a current SOC of the electrical source or the like is one example of the current value of the characteristic of the electrical source. Moreover, the "rated limit value of the electrical source" means a limit value of the current value of the characteristic of the electrical source which is determined by the rating or the like. For example, the limit value of the temperature at which the electrical source is capable of operating, the limit value of the SOC of the electrical source or the like is one example of the rated limit value of the electrical source.

Moreover, the second threshold value is preferably set to any value which is capable of appropriately distinguishing a state that the first electrical source is capable of performing the input/output of the first electrical power which satisfies the driving performance and a state that the first electrical source is not capable of performing the input/output of the first electrical power which satisfies the driving performance, with considering the specification of the first electrical source. Moreover, the second threshold value is preferably set to any value which is capable of appropriately distinguishing a state that the second electrical source is capable of performing the input/output of the second electrical power which satisfies the driving performance and a state that the second electrical source is not capable of performing the input/output of the second electrical power which satisfies the driving performance, with considering the specification of the second electrical source

<6>

In another aspect of the first electrical source control apparatus, the controlling device adjusts the ratio of the first electrical power on the basis of a difference between a current value of the characteristic of at least one of the first and second electrical sources and a rated limit value of at least one of the first and second electrical sources.

According to this aspect, the difference between the current value of the characteristic of the first electrical source and the rated limit value of the first electrical source substantially represents whether or not the first electrical source is capable of performing the stable or desired operation. Thus, the first electrical source control apparatus is capable of using the first and second electrical source more effectively, by adjusting the ratio of the first electrical power on the basis of the difference between the current value of the characteristic of the first electrical source and the rated limit value of the first electrical source.

Similarly, the difference between the current value of the characteristic of the second electrical source and the rated limit value of the second electrical source substantially represents whether or not the second electrical source is capable of performing the stable or desired operation. Thus, the first electrical source control apparatus is capable of using the first and second electrical source more effectively, by adjusting the ratio of the first electrical power on the basis of the difference between the current value of the characteristic of the second electrical source and the rated limit value of the second electrical source.

Incidentally, the ratio of the first electrical power may be adjusted in accordance with this aspect, when the difference between the current value of the characteristic of the first electrical source and the rated limit value of the first electrical source is less than the second threshold value (namely, when there is a possibility that the first electrical source is not capable of performing the stable or desired operation). Similarly, the ratio of the first electrical power may be adjusted in accordance with this aspect, when the difference between the current value of the characteristic of the second electrical source and the rated limit value of the second electrical source is less than the second threshold value (namely, when there is a possibility that the second electrical source is not capable of performing the stable or desired operation). Namely, the ratio of the first electrical power may not be necessarily adjusted in accordance with this aspect, when both of the difference between the current value of the characteristic of the first electrical source and the rated limit value of the first electrical source and the difference between the current value of the characteristic of the second electrical source and the rated limit value of the second electrical source are not less than the second threshold value (namely, when it is predicted that both of the first and second electrical sources are capable of performing the stable or desired operation).

<7>

In another aspect of the first electrical source control apparatus which adjust the ratio of the first electrical power on the basis of the difference between the current value of the characteristic of at least one of the first and second electrical sources and the rated limit value of at least one of the first and second electrical sources, the controlling device decreases the ratio of the first electrical power more as the difference between the current value of the characteristic of the first electrical source and the rated limit value of the first electrical source becomes smaller.

According to this aspect, when the difference between the current value of the characteristic of the first electrical source and the rated limit value of the first electrical source is relatively small, there is higher possibility that the first electrical source is not capable of performing the stable or the desired operation, compared to the case where the difference between the current value of the characteristic of the first electrical source and the rated limit value of the first electrical source is relatively large. Thus, in this case, the first electrical source control apparatus decreases the ratio of the first electrical power (namely, reduces a load of the first electrical source) and thus allows the first electrical source to perform the stable or desired operation. As described above, the first electrical source control apparatus is capable of using the first and second electrical sources more effectively.

<8>

In another aspect of the first electrical source control apparatus which adjust the ratio of the first electrical power on the basis of the difference between the current value of the characteristic of at least one of the first and second electrical sources and the rated limit value of at least one of the first and second electrical sources, the controlling device increases the ratio of the first electrical power more as the difference between the current value of the characteristic of the second electrical source and the rated limit value of the second electrical source becomes smaller.

According to this aspect, when the difference between the current value of the characteristic of the second electrical source and the rated limit value of the second electrical source is relatively small, there is higher possibility that the second electrical source is not capable of performing the stable or the desired operation, compared to the case where the difference between the current value of the characteristic of the second electrical source and the rated limit value of the second electrical source is relatively large. Thus, in this case, the first electrical source control apparatus increases the ratio of the first electrical power (namely, reduces a load of the second electrical source by increasing the load of the first electrical source) and thus allows the second electrical source to perform the stable or desired operation. As described above, the first electrical source control apparatus is capable of using the first and second electrical sources more effectively.

(Second Electrical Source Control Apparatus)

<9>

In order to solve the above described problem, a second electrical source control apparatus is an electrical source control apparatus for controlling a vehicle which travels by using an electrical source system including both of first and second electrical sources, the first electrical source performs an input/output of a first electrical power, the second electrical source performs an input/output of a second electrical power, a capacity of the second electrical source is smaller than that of the first electrical source and an output of the second electrical source is larger than that of the first electrical source, the electrical source control apparatus is provided with: an adjusting device configured to dynamically adjust a ratio of the first electrical power with respect to a required electrical power which is required for the electrical source system on the basis of a characteristic which is required for the vehicle; and a controlling device configured to control the first and second electrical sources such that the input/output of the first and second electrical powers are performed in accordance with the ratio which is adjusted by the adjusting device.

The second electrical source control apparatus is capable of controlling the vehicle which travels by using the electrical source system including both of the first and second electrical sources, as with the first electrical source control apparatus. Incidentally, an explanation of a feature which is same as that of the first electrical source control apparatus will be omitted.

In order to control the above described vehicle (in other words, the electrical source system which the above described vehicle is provided with), the second electrical source control apparatus is provided with the adjusting device and the controlling device.

The adjusting device adjusts the ratio of the first electrical power with respect to the required electrical power. Especially, the adjusting device adjust the ratio of the first electrical power on the basis of the characteristic which is required for the vehicle dynamically (namely, every time the characteristic required for the vehicle varies). For example, the adjusting device may adjust the ratio of the first electrical power such that the ratio is equal to the ratio which is suitable for (alternatively, optimum for) the characteristic required for the vehicle. Alternatively, for example, the adjusting device may adjust the ratio of the first electrical power such that the ratio is equal to the ratio which satisfies (achieves or realizes) the characteristic required for the vehicle.

More specifically, for example, the adjusting device may adjust the ratio of the first electrical power such that the ratio is suitable for the characteristic which prioritizes a driving performance, if the characteristic required for the vehicle is the characteristic which prioritizes the driving performance over a fuel efficiently. Alternatively, the adjusting device may adjust the ratio of the first electrical power such that the ratio is suitable for the characteristic which prioritizes the fuel efficiency, if the characteristic required for the vehicle is the characteristic which prioritizes the fuel efficiency over the driving performance. Alternatively, the adjusting device may adjust the ratio of the first electrical power such that the ratio is suitable for another characteristic, if the characteristic required for the vehicle is another characteristic. Alternatively, the adjusting device may adjust the ratio of the first electrical power on the basis of a relative relationship between the priority of the fuel efficiency and the priority of the driving performance. Alternatively, the adjusting device may adjust the ratio of the first electrical power to prevent a depletion of the second electrical source whose capacity is relatively small. Alternatively, the adjusting device may adjust the ratio of the first electrical power to actively use the second electrical source whose output is relatively large in accordance with a rapid increase or decrease of the required electrical power or the like.

As described above, the adjusting device is capable of appropriately adjusting the ratio of the first electrical power every time the characteristic required for the vehicle varies along with the traveling of the vehicle. Namely, the adjusting device is capable of appropriately varying the ratio of the first electrical power on the basis of the characteristic required for the vehicle.

The controlling device controls the first electrical source such that the input/output of the first electrical power is performed in accordance with the ratio which is adjusted by the adjusting device. The controlling device similarly controls the second electrical source such that the input/output of the second electrical power is performed in accordance with the ratio which is adjusted by the adjusting device. As a result, the first electrical source performs the input/output of the first electrical power which directly satisfies the ratio which is adjusted by the adjusting device. Moreover, the second electrical source performs the input/output of the second electrical power which indirectly satisfies the ratio which is adjusted by the adjusting device. Therefore, the first and second electrical sources can be effectively used in accordance with the ratio which is adjusted by the adjusting device.

As described above, the second electrical source control apparatus is capable of appropriately varying the ratio of the first electrical power, as with the first electrical source control apparatus. In other words, according to the second electrical source control apparatus, the ratio of the first electrical power is not necessarily fixed to constant ratio, as with the first electrical source control apparatus. Therefore, the second electrical source apparatus is capable of enjoying the effect which is same as the effect of the first electrical source apparatus. Namely, the second electrical source control apparatus is capable of effectively using the first and second electrical sources to support the plurality of characteristics which are different from each other.

<10/11>

In another aspect of the second electrical source control apparatus, the adjusting device (i) adjusts the ratio of the first electrical power such that the ratio of the first electrical power is less than a first threshold value, if the characteristic which is required for the vehicle is a characteristic which prioritizes a fuel efficiency over a driving performance, and (ii) adjusts the ratio of the first electrical power such that the ratio of the first electrical power is more than the first threshold value, if the characteristic which is required for the vehicle is a characteristic which prioritizes the driving performance over the fuel efficiency Alternatively, in another aspect of the second electrical source control apparatus, the adjusting device (i) adjusts the ratio of the first electrical power such that the ratio of the first electrical power is less than a ratio of the second electrical power with respect to the required electrical power, if the characteristic which is required for the vehicle is a characteristic which prioritizes a fuel efficiency over a driving performance, and (ii) adjusts the ratio of the first electrical power such that the ratio of the first electrical power is more than the ratio of the second electrical power, if the characteristic which is required for the vehicle is a characteristic which prioritizes the driving performance over the fuel efficiency.

According to this aspect, the adjusting device adjusts the ratio of the first electrical power such that the ratio of the first electrical power is relatively small, if the vehicle prioritizes the fuel efficiency over the driving performance. Therefore, the fuel efficiency of the vehicle improves, as with the first electrical source control apparatus. On the other hand, the adjusting device adjusts the ratio of the first electrical power such that the ratio of the first electrical power is relatively large, if the vehicle prioritizes the driving performance over the fuel efficiency. Therefore, a cost, a size or the like of the second electrical source can be reduced and it is possible to satisfy the characteristic which prioritizes the driving performance for a longer time, as with the first electrical source control apparatus.

<12/13>

In another aspect of the second electrical source control apparatus which adjusts the ratio of the first electrical power such that the ratio of the first electrical power is more than the first threshold value if the characteristic which is required for the vehicle is the characteristic which prioritizes the driving performance over the fuel efficiency, the adjusting device does not adjust the ratio of the first electrical power such that the ratio of the first electrical power is more than the first threshold value, if a difference between a current value of the characteristic of at least one of the first and second electrical sources and a rated limit value of at least one of the first and second electrical sources is less than a second threshold value, even if the characteristic which is required for the vehicle is the characteristic which prioritizes the driving performance over the fuel efficiency.

Alternatively, in another aspect of the second electrical source control apparatus which adjusts the ratio of the first electrical power such that the ratio of the first electrical power is more than the ratio of the second electrical power if the characteristic which is required for the vehicle is the characteristic which prioritizes the driving performance over the fuel efficiency, the adjusting device does not adjust the ratio of the first electrical power such that the ratio of the first electrical power is more than the ratio of the second electrical power, if a difference between a current value of the characteristic of at least one of the first and second electrical sources and a rated limit value of at least one of the first and second electrical sources is less than a second threshold value, even if the characteristic which is required for the vehicle is the characteristic which prioritizes the driving performance over the fuel efficiency.

According to this aspect, as with the first electrical source control apparatus, if there is a possibility that at least one of the first and second electrical sources is not capable of performing the stable or desired operation, the adjusting device does not necessarily adjust the ratio of the first electrical power such that the ratio is equal to the ratio for prioritizing the driving performance, even if the characteristic which is required for the vehicle is the characteristic which prioritizes the driving performance over the fuel efficiency.

<14>

In another aspect of the second electrical source control apparatus, the adjusting device further adjusts the ratio of the first electrical power on the basis of a difference between a current value of the characteristic of at least one of the first and second electrical sources and a rated limit value of at least one of the first and second electrical sources.

According to this aspect, as with the first electrical source control apparatus, the second electrical source control apparatus is capable of using the first and second electrical source more effectively, by adjusting the ratio of the first electrical power on the basis of the difference between the current value of the characteristic of the first electrical source and the rated limit value of the first electrical source. Similarly, as with the first electrical source control apparatus, the second electrical source control apparatus is capable of using the first and second electrical source more effectively, by adjusting the ratio of the first electrical power on the basis of the difference between the current value of the characteristic of the second electrical source and the rated limit value of the second electrical source.

<15>

In another aspect of the second electrical source control apparatus which adjusts the ratio of the first electrical power on the basis of the difference between the current value of the characteristic of at least one of the first and second electrical sources and the rated limit value of at least one of the first and second electrical sources, the adjusting device decreases the ratio of the first electrical power more as the difference between the current value of the characteristic of the first electrical source and the rated limit value of the first electrical source becomes smaller.

According to this aspect, as with the first electrical source control apparatus, the second electrical source control apparatus decreases the ratio of the first electrical power (namely, reduces a load of the first electrical source) and thus allows the first electrical source to perform the stable or desired operation.

<16>

In another aspect of the second electrical source control apparatus which adjusts the ratio of the first electrical power on the basis of the difference between the current value of the characteristic of at least one of the first and second electrical sources and the rated limit value of at least one of the first and second electrical sources, the adjusting device increases the ratio of the first electrical power more as the difference between the current value of the characteristic of the second electrical source and the rated limit value of the second electrical source becomes smaller.

According to this aspect, as with the first electrical source control apparatus, the second electrical source control apparatus increases the ratio of the first electrical power (namely, reduces a load of the second electrical source by increasing the load of the first electrical source) and thus allows the second electrical source to perform the stable or desired operation.

An operation and another advantage of the present invention will become more apparent from the embodiments explained below.

DESCRIPTION OF EMBODIMENTS

Hereinafter, with reference to drawings, an embodiment in which the present invention is applied to a vehicle 1 which has a motor generator 10 will be explained as one example of the embodiment of the present invention.

(1) Structure of Vehicle

Firstly, with reference to FIG. 1, the structure of the vehicle 1 of the present embodiment will be explained. FIG.

1 is a block diagram illustrating one example of the structure of the vehicle 1 of the present embodiment.

Figure 1:
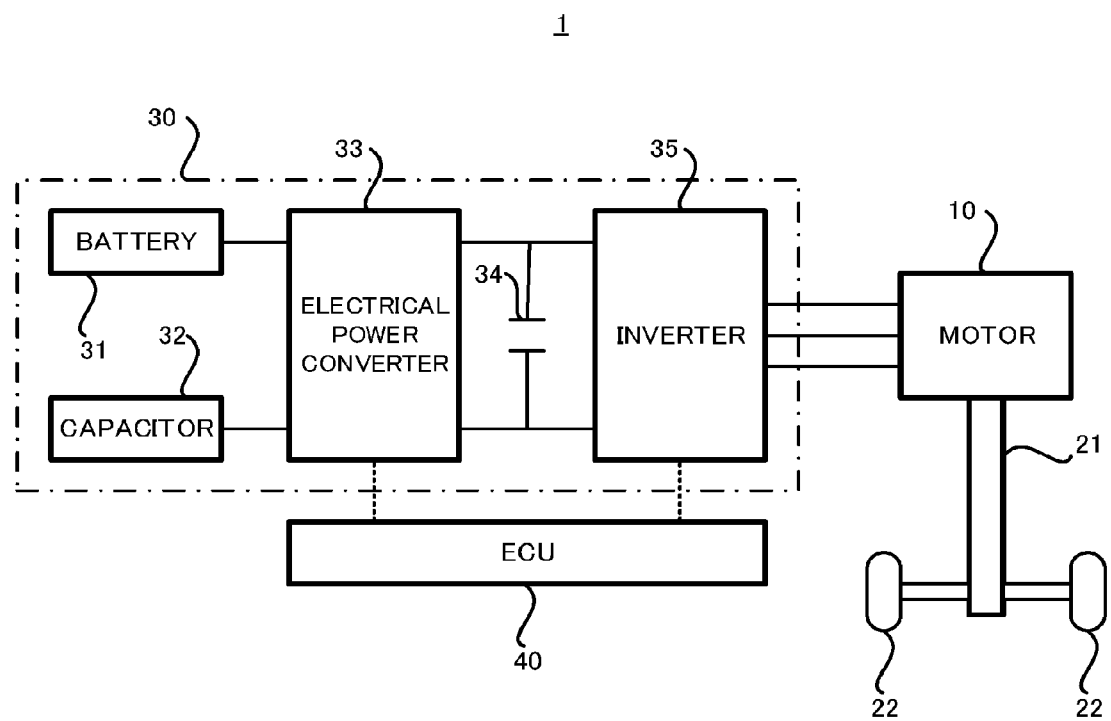
FIG. 1 is a block diagram illustrating one example of a structure of a vehicle of a present embodiment.

As illustrated in FIG. 1, the vehicle 1 has a motor generator 10, an axle shaft 21, wheels 22, an electrical source system 30 and an ECU 40 which is one example of the "electrical source control apparatus (namely, the selecting device, the adjusting device and the controlling device)".

The motor generator 10 operates by using an electrical power outputted from the electrical source system 30 to function as a motor for supplying a driving power (namely, a driving power which is required for the vehicle 1 to travel) to the axle shaft 21, when the vehicle 1 is in a power running state. Furthermore, the motor generator 10 functions as a generator for charging a battery 31 and a capacitor 32 in the electrical source system 30, when the vehicle 1 is in a regeneration state.

The axle shaft 21 is a transmission shaft for transmitting the driving power outputted from the motor generator 10 to the wheels 22.

The wheels 22 transmits the driving power transmitted via the axle shaft 21 to a road. FIG. 1 illustrates an example in which the vehicle 1 has one wheel 22 at each of right and left sides. However, it is actually preferable that the vehicle 1 have one wheel 22 at each of a front-right side, a front-left side, a rear-right side and a rea-left side (namely, have four wheels 22 in total).

Incidentally, FIG. 1 illustrates, as an example, the vehicle 1 which is provided with one motor generator 10. However, the vehicle 1 may be provided with two or more motor generators 10. Furthermore, the vehicle 1 may be provided with an engine in addition to the motor generator 10. Namely, the vehicle 1 in the present embodiment may be an EV (Electrical Vehicle) or a HV (Hybrid Vehicle).

The electrical source system 30 outputs the electrical power, which is required for the motor generator 10 to function as the motor, to the motor generator 10, when the vehicle 1 is in the power running state. Furthermore, the electrical power which is generated by the motor generator 10 functioning as the generator is inputted from the motor generator 10 to the electrical source system 30, when the vehicle 1 is in the regeneration state.

This electrical source system 30 is provided with the battery 31 which is one example of the "first electrical source", the capacitor 32 which is one example of the "second electrical source", an electrical power converter 33, a smoothing condenser 34 and an inverter 35.

The battery 31 is a secondary battery which is capable of performing an input/output (namely, charge/discharge) of the electrical power by using an electrochemical reaction (namely, a reaction for converting a chemical energy to an electrical energy) and the like. A lead battery, a lithium-ion battery, a nickel-hydrogen battery, a fuel battery or the like is one example of the battery 31, for example.

The capacitor 32 is capable of performing an input/output of the electrical power by using a physical effect or a chemical effect for storing electrical charge (namely, an electrical energy). An electrical double layer capacitor or the like is one example of the capacitor 32, for example.

Incidentally, two types of any electrical sources which is capable of performing the input/output of the electrical power may be used, instead of the battery 31 and the capacitor 32. In this case, the electrical source which is used instead of the battery 31 may be an electrical source whose capacity is larger (alternatively, whose energy density is larger) than that of the electrical source which is used instead of the capacitor 32. Alternatively, the electrical source which is used instead of the battery 31 may be an electrical source which is capable of outputting a constant electrical power over a longer time than the electrical source which is used instead of the capacitor 32. Moreover, the electrical source which is used instead of the capacitor 32 may be an electrical source whose output is larger than that of the electrical source which is used instead of the battery 31. Alternatively, the electrical source which is used instead of the capacitor 32 may be an electrical source which is capable of performing the input/output of the electrical power more rapidly (drastically) than the electrical source which is used instead of the battery 31. A high capacity type battery (namely, the electrical source which is used instead of the battery 31) and a high output type battery (namely, the electrical source which is used instead of the capacitor 32) or a high capacity type capacitor (namely, the electrical source which is used instead of the battery 31) and a high output type capacitor (namely, the electrical source which is used instead of the capacitor 32) are one example of two types of the electrical sources, for example.

The electrical power converter 33 converts the electrical power which is outputted from the battery 31 and the electrical power which is outputted from the capacitor 32 depending on a required electrical power which is required for the electrical source system 30 (typically, the required electrical power is an electrical power which the electrical source system 30 should output to the motor generator 10, for example), under the control of the ECU 40. The electrical power converter 33 outputs the converted electrical power to the inverter 35. Furthermore, the electrical power converter 33 converts the electrical power which is inputted from the inverter 35 (namely, the electrical power which is generated by the regeneration of the motor generator 10) depending on the required electrical power which is required for the electrical source system 30 (typically, the required electrical power is an electrical power which should be inputted to the electrical source system 30, and the required electrical power is substantially an electrical power which should be inputted to the battery 31 and the capacitor 32, for example), under the control of the ECU 40. The electrical power converter 33 outputs the converted electrical power to at least one of the battery 31 and the capacitor 32. The above described electrical power conversion allows the electrical power converter 33 to distribute the electrical power among the battery 31, the capacitor 32 and the inverter 35.

Incidentally, FIG. 1 illustrate, as an example, the electrical source system 30 having single electrical power converter 33 which is shared by the battery 31 and the capacitor 32. However, the electrical source system 30 may be provided with two or more electrical power converters 33 (for example, the electrical power converter 33 for the battery 31 and the electrical power converter 33 for the capacitor 32).

The smoothing condenser 34 smooths the variation of the electrical power which is supplied from the electrical power converter 33 to the inverter 35 (substantially, the variation of the electrical voltage at a source line between the electrical power converter 33 and the inverter 35), when the vehicle 1 is in the power running state. The smoothing condenser 34 similarly smooths the variation of the electrical power which is supplied to the electrical power converter 33 from the inverter 35 (substantially, the variation of the electrical voltage at the source line between the electrical power converter 33 and the inverter 35), when the vehicle 1 is in the regeneration state.

The inverter 35 converts the electrical power (DC (direct current) electrical power), which is outputted from the electrical power converter 33, to an AC (alternating current) electrical power, when the vehicle 1 is in the power running state. Then, the inverter 35 supplies the electrical power, which is converted to the AC electrical power, to the motor generator 10. Furthermore, the inverter 35 converts the electrical power (AC electrical power), which is generated by the motor generator 10, to the DC electrical power. Then, the inverter 35 supplies the electrical power, which is converted to the DC electrical power, to the electrical power converter 33.

The ECU 40 is an electrical controlling unit which is configured to control the whole of the operation of the vehicle 1. The ECU 40 is provided with a CPU (Central Processing Unit), a ROM (Read Only Memory), a RAM (Random Access Memory) and so on.

Especially, the ECU 40 controls the distribution of the electrical power which is performed by the above described electrical power converter 33. More specifically, the ECU 40 controls the electrical power converter 33 to appropriately vary a ratio (share) of each of the battery 31 and the capacitor 32 on the basis of a character which is required for the vehicle. Incidentally, this "ratio" means the percentage (proportion) of each of the electrical power which is inputted to or outputted from the battery 31 (hereinafter, it is referred to as a "battery power") and the electrical power which is inputted to or outputted from the capacitor 32 (hereinafter, it is referred to as a "capacitor power") with respect to the required electrical power which is required for the electrical source system 30. Incidentally, when the vehicle 1 is in the power running state, the required electrical power is substantially a required outputted electrical power which should be outputted from the electrical source system 30 to the motor generator 10. Therefore, in this case, the ratio means the percentage (proportion) of each of the electrical power which is outputted from the battery 31 (hereinafter, it is referred to as a "battery outputted power") and the electrical power which is outputted from the capacitor 32 (hereinafter, it is referred to as a "capacitor outputted power") with respect to the required outputted electrical power. On the other hand, when the vehicle 1 is in the regeneration state, the required electrical power is substantially a required inputted electrical power which should be inputted to the electrical source system 30 from the motor generator 10. Therefore, in this case, the ratio means the percentage (proportion) of each of the electrical power which is inputted to the battery 31 (hereinafter, it is referred to as a "battery inputted power") and the electrical power which is inputted to the capacitor 32 (hereinafter, it is referred to as a "capacitor inputted power") with respect to the required inputted electrical power.

Hereinafter, an operation of varying the ratio of each of the battery 31 and the capacitor 32 which is performed under the control of the ECU 40 will be explained in detail.

(2) Operation of Varying Ratios of Battery and Capacitor

Next, with reference to FIG. 2 to FIG. 5, the control operation of the vehicle 1 in the present embodiment (substantially, the control operation of the electrical source system 30, and the operation of varying the ratio of each of the battery 31 and the capacitor 32) will be explained.

(2-1) Entire Flow of Operation of Varying Ratios of Battery and Capacitor

Figure 2:
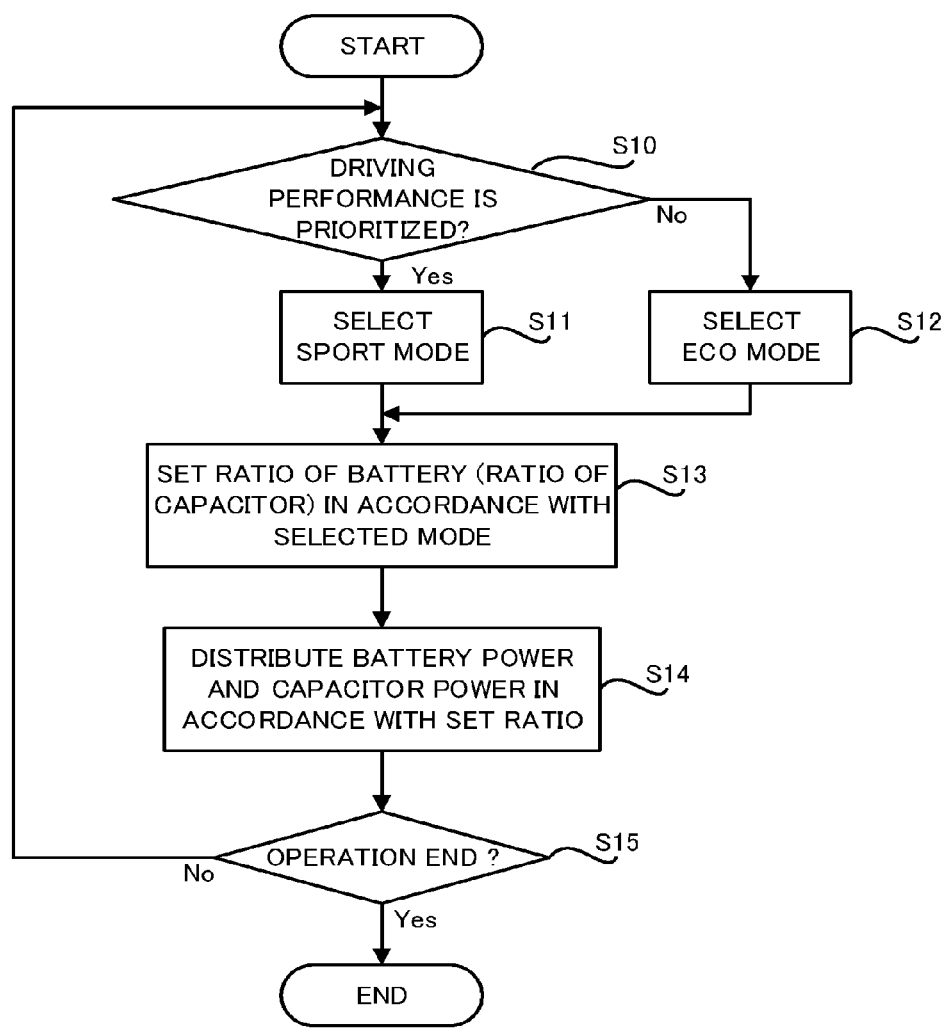
FIG. 2 is a flowchart illustrating an entire flow of the control operation of the vehicle in the present embodiment (substantially, the control operation of the electrical source system, and the operation of varying the ratio of each of the battery and the capacitor).

Firstly, with reference to FIG. 2, the entire flow of the control operation of the vehicle 1 in the present embodiment (substantially, the control operation of the electrical source system 30, and the operation of varying the ratio of each of the battery 31 and the capacitor 32) will be explained. FIG. 2 is a flowchart illustrating an entire flow of the control operation of the vehicle 1 in the present embodiment (substantially, the control operation of the electrical source system 30, and the operation of varying the ratio of each of the battery 31 and the capacitor 32).

As illustrated in FIG. 2, the ECU 40 determines whether or not the characteristic required for the vehicle is a characteristic which prioritizes a driving performance over a fuel efficiency (step S10). For example, an example in which there are a sport mode which prioritizes the driving performance and an eco (ecology) mode which prioritizes the fuel efficiency as a driving mode (traveling mode) of the vehicle 1 will be explained. In this case, for example, the ECU 40 may determine whether or not the characteristic required for the vehicle is the characteristic which prioritizes the driving performance over the fuel efficiency on the basis of a user's operation using an operational button for selecting the sport mode or the eco mode. Alternatively, the ECU 40 may autonomously determine whether or not the characteristic required for the vehicle is the characteristic which prioritizes the driving performance over the fuel efficiency by considering a driving condition (traveling condition) of the vehicle.

As a result of the determination at the step S10, if it is determined that the characteristic required for the vehicle is the characteristic which prioritizes the driving performance over the fuel efficiency (step S10: Yes), the ECU 40 selects the sport mode as the driving mode of the vehicle 1 (step S11). In this case, the ECU 40 sets (in other words, adjusts) the ratio of each of the battery 31 and the capacitor 32 in accordance with the sport mode. The operation of setting the ratio of each of the battery 31 and the capacitor 32 in accordance with the sport mode will be explained later in detail (see FIG. 3 and FIG. 4).

Incidentally, the ratio of the capacitor 32 is also set if the ratio of the battery 31 is set, because the electrical source system 30 is not provided with another electrical source other than the battery 31 and the capacitor 32. Therefore, the ECU 40 may set the ratio of at least one of the battery 31 and the capacitor 32. However, the electrical source system 30 may be provided with another electrical source other than the battery 31 and the capacitor 32. In this case, the ECU 40 preferably sets the ratios of at least two of the battery 31, the capacitor 32 and another electrical source.

On the other hand, as a result of the determination at the step S10, if it is determined that the characteristic required for the vehicle is not the characteristic which prioritizes the driving performance over the fuel efficiency (namely, the characteristic required for the vehicle is the characteristic which prioritizes the fuel efficiency over the driving performance) (step S10: No), the ECU 40 selects the eco mode as the driving mode of the vehicle 1 (step S12). In this case, the ECU 40 sets (in other words, adjusts) the ratio of each of the battery 31 and the capacitor 32 in accordance with the eco mode. The operation of setting the ratio of each of the battery 31 and the capacitor 32 in accordance with the eco mode will be explained later in detail (see FIG. 3 and FIG. 4).

Then, the ECU 40 controls the electrical power converter 33 such that the battery power is inputted to or outputted from the battery 31 and the capacitor power is inputted to or outputted from the capacitor 32 in accordance with the ratio which is set at the step S13 (step S14). As a result, the battery 31 performs the input/output of the battery power in accordance with the ratio which is set at the step S13. Similarly, the capacitor 32 performs the input/output of the capacitor power in accordance with the ratio which is set at the step S13.

The above described operation is repeated regularly or randomly until the vehicle 1 stops traveling (step S15).

(2-2) Detail of Operation of Varying Ratios of Battery and Capacitor

Figure 3:
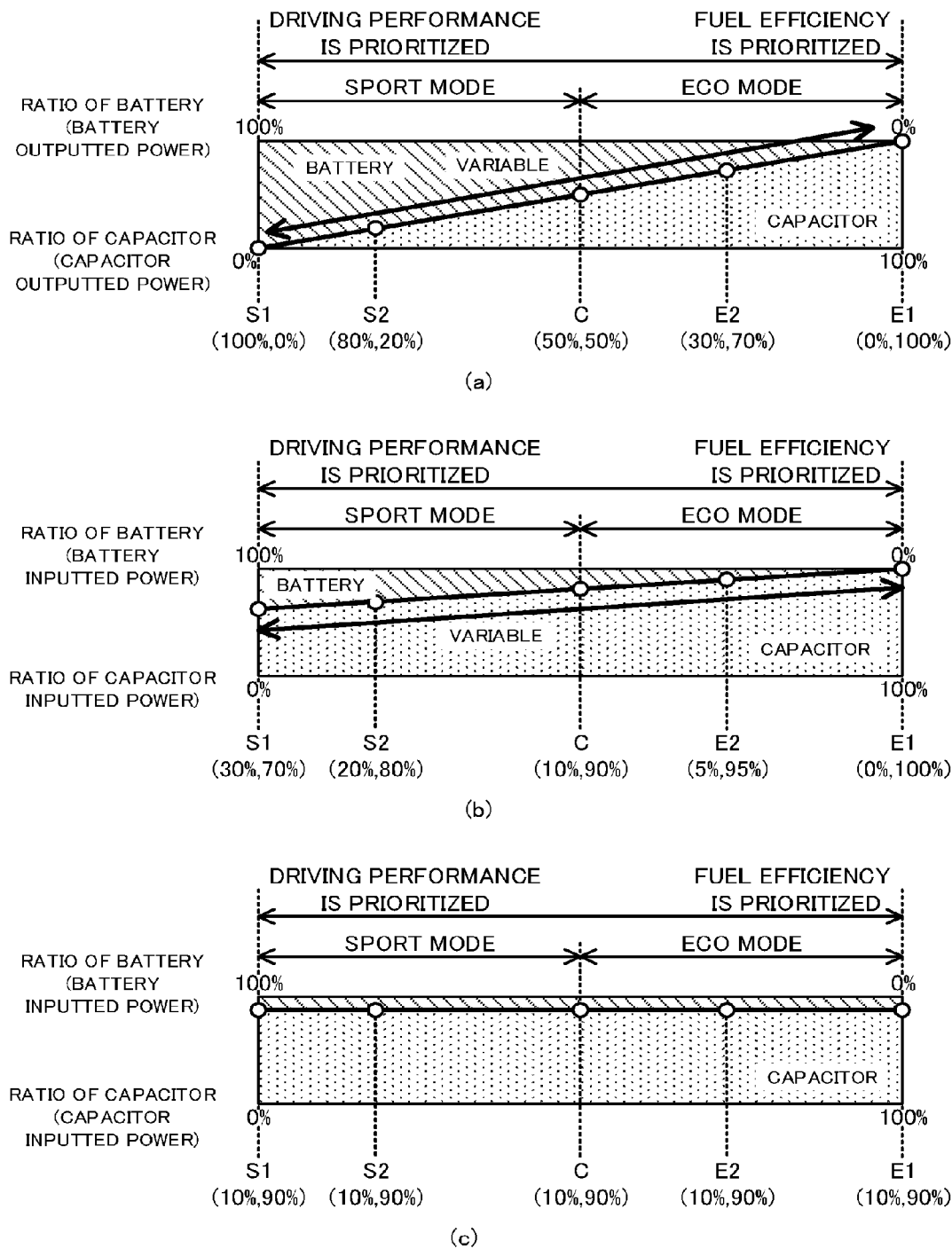
FIG. 3 are graphs each of which conceptually illustrates an aspect of varying the ratio of each of the battery and the capacitor.
Figure 4:
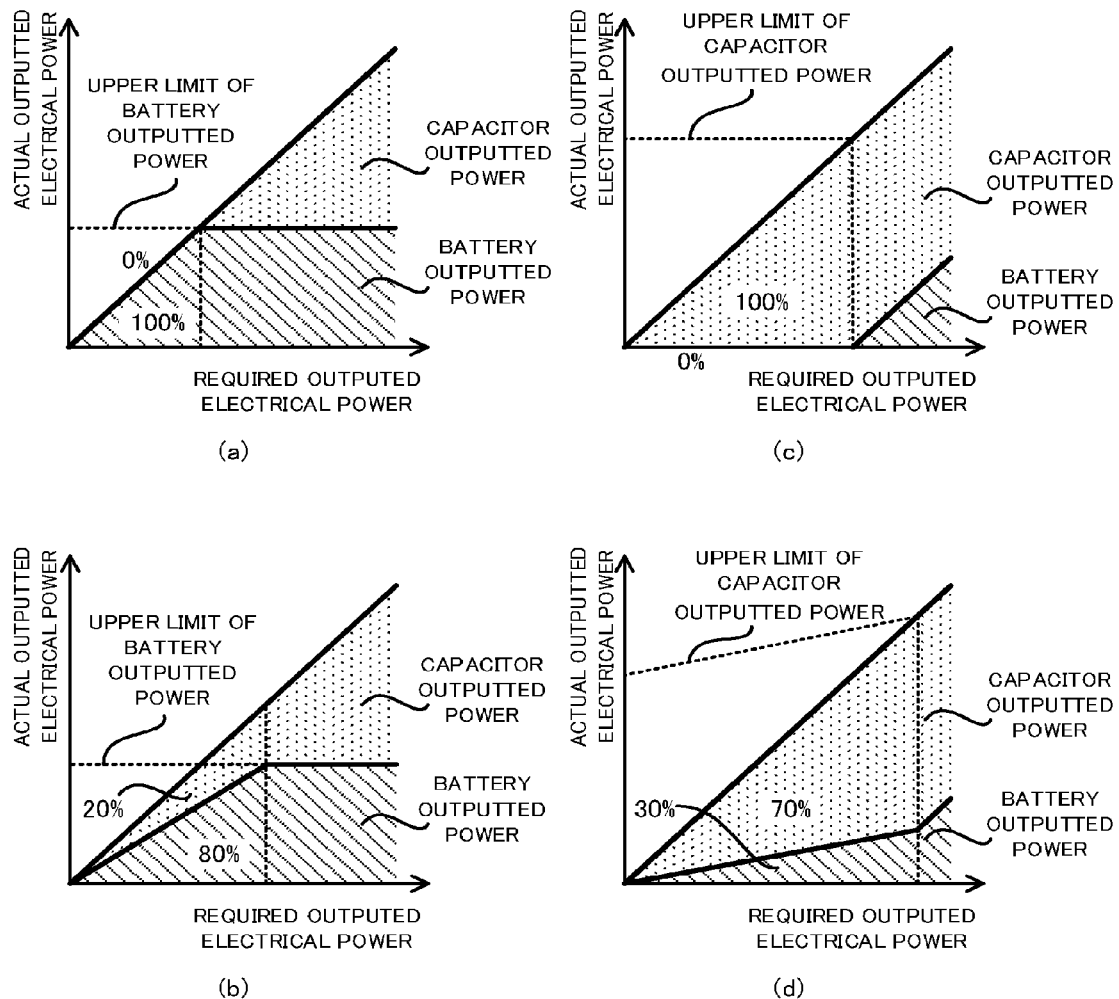
FIG. 4 are graphs each of which conceptually illustrates a relationship between the required outputted electrical power and the battery outputted power/capacitor outputted power in respective one of cases, the ratios of each of the battery and the capacitor in the cases are different from each other.
Figure 5:
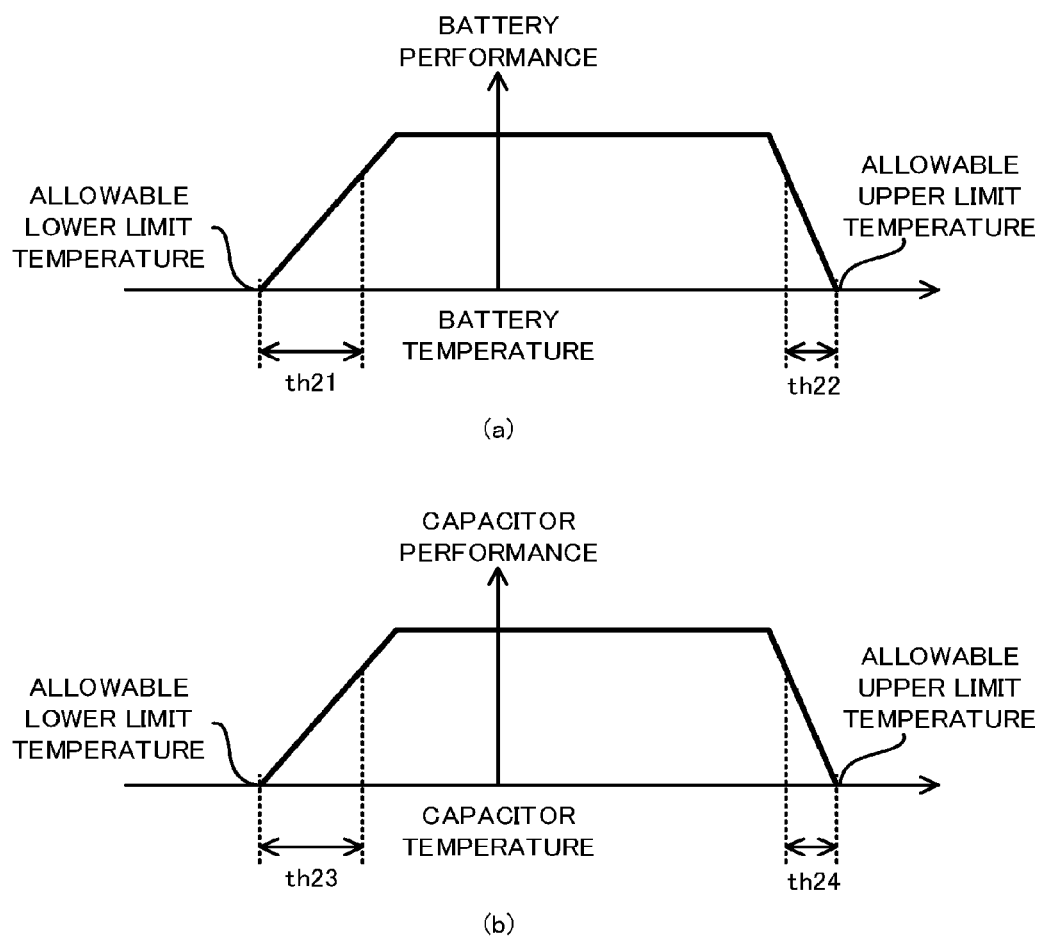
FIG. 5 are graphs each of which illustrate a temperature property of the battery and the capacitor.

Next, with reference to FIG. 3 and FIG. 4, the operation of varying (substantially, setting) the ratio of each of the battery 31 and the capacitor 32 in accordance with the sport mode and the eco mode will be explained. FIG. 3 are graphs each of which conceptually illustrates an aspect of varying the ratio of each of the battery 31 and the capacitor 32. FIG. 4 are graphs each of which conceptually illustrates a relationship between the required outputted electrical power and the battery outputted power/capacitor outputted power in respective one of cases, the ratios of each of the battery 31 and the capacitor 32 in the cases are different from each other.

As illustrated in FIG. 3(a) to FIG. 3(c), in the present embodiment, the sport mode and the eco mode are the driving modes which can be distinguished from each other on the basis of the ratio of each of the battery 31 and the capacitor 32, for example.

For example, the sport mode and the eco mode may be distinguished by the magnitude relationship between the ratio of the battery 31 (namely, the ratio of the battery outputted power) and the ratio of the capacitor 32 (namely, the ratio of the capacitor outputted power).

Specifically, as illustrated in FIG. 3(a), the sport mode may be a driving mode in which the ratio of the battery 31 (namely, the ratio of the battery outputted power) is larger than the ratio of the capacitor 32 (namely, the ratio of the capacitor outputted power) when the vehicle 1 is in the power running state, for example. FIG. 3(a) illustrates an example in which the ratio of the battery 31 increases more as the driving performance is prioritized more (namely, the operational point moves to a left side more in FIG. 3(a)).

If the sport mode is selected, the ECU 40 may set the ratio of each of the battery 31 and the capacitor 32 such that the ratio of the battery 31 in the power running state is larger than the ratio of the capacitor 32 in the power running state. Specifically, for example, as illustrated in a point S1 in FIG. 3(a), the ECU 40 may set the ratio of each of the battery 31 and the capacitor 32 such that the ratio of the battery 31 is 100% and the ratio of the capacitor 32 is 0%. In this case, as illustrated in FIG. 4(a), all of the required outputted electrical power is outputted from the battery 31 as the battery outputted power. Alternatively, for example, as illustrated in a point S2 in FIG. 3(a), the ECU 40 may set the ratio of each of the battery 31 and the capacitor 32 such that the ratio of the battery 31 is 80% and the ratio of the capacitor 32 is 20%. In this case, as illustrated in FIG. 4(b), 80% of the required outputted electrical power is outputted from the battery 31 as the battery outputted power and 20% of the required outputted electrical power is outputted from the capacitor 32 as the capacitor outputted power.

On the other hand, as illustrated in FIG. 3(a), the eco mode may be a driving mode in which the ratio of the battery 31 is smaller than the ratio of the capacitor 32 when the vehicle 1 is in the power running state. FIG. 3(a) illustrates an example in which the ratio of the battery 31 decreases more as the fuel efficiency is prioritized more (namely, the operational point moves to a right side more in FIG. 3(a)).

If the eco mode is selected, the ECU 40 may set the ratio of each of the battery 31 and the capacitor 32 such that the ratio of the battery 31 in the power running state is smaller than the ratio of the capacitor 32 in the power running state. Specifically, for example, as illustrated in a point E1 in FIG. 3(a), the ECU 40 may set the ratio of each of the battery 31 and the capacitor 32 such that the ratio of the battery 31 is 0% and the ratio of the capacitor 32 is 100%. In this case, as illustrated in FIG. 4(c), all of the required outputted electrical power is outputted from the capacitor 32 as the capacitor outputted power. Alternatively, for example, as illustrated in a point E2 in FIG. 3(a), the ECU 40 may set the ratio of each of the battery 31 and the capacitor 32 such that the ratio of the battery 31 is 30% and the ratio of the capacitor 32 is 70%. In this case, as illustrated in FIG. 4(d), 30% of the required outputted electrical power is outputted from the battery 31 as the battery outputted power and 70% of the required outputted electrical power is outputted from the capacitor 32 as the capacitor outputted power.

However, as illustrated in FIG. 4(a) to FIG. 4(d), the ratio which is set at the step S13 in FIG. 2 is maintained when (i) the battery outputted power in accordance with this ratio is not larger than an upper limit of the battery outputted power which can be outputted from the battery 31 and (ii) the capacitor outputted power in accordance with this ratio is not larger than an upper limit of the capacitor outputted power which can be outputted from the capacitor 32. Namely, the ECU 40 preferably keeps controlling the electrical power converter 33 such that the battery 31 outputs the battery outputted power and the capacitor 32 outputs the capacitor outputted power in accordance with the ratio which is set at the step S13, when each of the battery outputted power and the capacitor outputted power in accordance with this ratio is not larger than the upper limit.

On the other hand, when the battery outputted power in accordance with the ratio which is set at the step S13 is larger than the upper limit, the shortage of the battery outputted power is preferably compensated by the capacitor outputted power, regardless of the ratio which is set at the step S13 (see FIG. 4(a) and FIG. 4(b)). Namely, the ECU 40 preferably controls the electrical power converter 33 to compensate the shortage of the battery outputted power by using the capacitor outputted power, regardless of the ratio which is set at the step S13.

Similarly, when the capacitor outputted power in accordance with the ratio which is set at the step S13 is larger than the upper limit, the shortage of the capacitor outputted power is preferably compensated by the battery outputted power, regardless of the ratio which is set at the step S13 (see FIG. 4(c) and FIG. 4(d)). Namely, the ECU 40 preferably controls the electrical power converter 33 to compensate the shortage of the capacitor outputted power by using the battery outputted power, regardless of the ratio which is set at the step S13.

Same is true in the regeneration state, which will be explained below. Namely, the ECU 40 preferably keeps controlling the electrical power converter 32 such that the battery inputted power is inputted to the battery 31 and the capacitor inputted power is inputted to the capacitor 33 in accordance with the ratio which is set at the step S13, when each of the battery inputted power and the capacitor inputted power in accordance with the ratio which is set at the step S13 is not larger than the upper limit. On the other hand, the ECU 40 preferably controls the electrical power converter 33 such that an excess of the battery inputted power is inputted to the capacitor 32 as the capacitor inputted power, regardless of the ratio which is set at the step S13, when the battery inputted power in accordance with the ratio which is set at the step S13 is larger than the upper limit. Similarly, the ECU 40 preferably controls the electrical power converter 33 such that an excess of the capacitor inputted power is inputted to the battery 31 as the battery inputted power, regardless of the ratio which is set at the step S13, when the capacitor inputted power in accordance with the ratio which is set at the step S13 is larger than the upper limit.

Incidentally, FIG. 3(*a*) illustrates an example in which the eco mode is the driving mode associated with a range of the ratio of the battery 31 which is equal to or more than 0% and less than 50%. However, the eco mode may be the driving mode associated with a range of the ratio of the battery 31 which is equal to or more than A % (however, A is more than 0 and less than 50) and less than B % (however, B is more than A and less than 50). Namely, the relationship between the eco mode and the ratio of each of the battery 31 and the capacitor 32 which is illustrated in FIG. 3(*a*) is merely one example.

Similarly, FIG. 3(*a*) illustrates an example in which the sport mode is the driving mode associated with a range of the ratio of the battery 31 which is equal to or more than 50% and less than 100%. However, the sport mode may be the driving mode associated with a range of the ratio of the battery 31 which is equal to or more than C % (however, C is more than 50 and less than 100) and less than D % (however, D is more than C and less than 100). Namely, the relationship between the sport mode and the ratio of each of the battery 31 and the capacitor 32 which is illustrated in FIG. 3(*a*) is merely one example.

FIG. 3(*b*) and FIG. 3(*c*), which will be explained later, also merely illustrate one example of the relationship between sport mode/the eco mode and the ratio of each of the battery 31 and the capacitor 32.

Alternatively, for example, the sport mode and the eco mode may be distinguished by the magnitude relationship between the ratio of the battery 31 (namely, the ratio of the battery outputted power) and a predetermined mode threshold value.

Specifically, as illustrated in FIG. 3(*b*), the sport mode may be a driving mode in which the ratio of the battery 31 is larger than the predetermined more threshold value (10% in the example illustrated in FIG. 3(*b*)) when the vehicle 1 is in the regeneration state, for example. Therefore, in this case, the ECU 40 may set the ratio of each of the battery 31 and the capacitor 32 such that the ratio of the battery 31 is larger than the mode threshold value. Specifically, for example, as illustrated in a point S1 in FIG. 3(*b*), the ECU 40 may set the ratio of each of the battery 31 and the capacitor 32 such that the ratio of the battery 31 is 30% and the ratio of the capacitor 32 is 70%. In this case, 30% of the regenerated electrical power (namely, substantially the required inputted electrical power), which is generated by the regeneration, is inputted to the battery 31 as the battery inputted power and 70% of the regenerated electrical power is inputted to the capacitor 32 as the capacitor inputted power. Alternatively, for example, as illustrated in a point S2 in FIG. 3(*b*), the ECU 40 may set the ratio of each of the battery 31 and the capacitor 32 such that the ratio of the battery 31 is 20% and the ratio of the capacitor 32 is 80%. In this case, 20% of the regenerated electrical power is inputted to the battery 31 as the battery inputted power and 80% of the regenerated electrical power is inputted to the capacitor 32 as the capacitor inputted power.

On the other hand, as illustrated in FIG. 3(*b*), the eco mode may be a driving mode in which the ratio of the battery 31 is smaller than the predetermined more threshold value (10% in the example illustrated in FIG. 3(*b*)) when the vehicle 1 is in the regeneration state, for example. Therefore, in this case, the ECU 40 may set the ratio of each of the battery 31 and the capacitor 32 such that the ratio of the battery 31 is smaller than the mode threshold value. Specifically, for example, as illustrated in a point E1 in FIG. 3(*b*), the ECU 40 may set the ratio of each of the battery 31 and the capacitor 32 such that the ratio of the battery 31 is 0% and the ratio of the capacitor 32 is 100%. In this case, all of the regenerated electrical power is inputted to the capacitor 32 as the capacitor inputted power. Alternatively, for example, as illustrated in a point E2 in FIG. 3(*b*), the ECU 40 may set the ratio of each of the battery 31 and the capacitor 32 such that the ratio of the battery 31 is 5% and the ratio of the capacitor 32 is 95%. In this case, 5% of the regenerated electrical power is inputted to the battery 31 as the battery inputted power and 95% of the regenerated electrical power is inputted to the capacitor 32 as the capacitor inputted power.

Incidentally, FIG. 3(*b*) illustrates an example in which the sport mode and the eco mode is distinguished by the magnitude relationship between the ratio of the battery 31 in the regeneration state and the predetermined mode threshold value. Needless to say, the sport mode and the eco mode may be distinguished by the magnitude relationship between the ratio of the battery 31 in the power running state and the predetermined mode threshold value, in addition to or instead of the magnitude relationship between the ratio of the battery 31 in the regeneration state and the predetermined mode threshold value. Namely, the sport mode may be a driving mode in which the ratio of the battery 31 is larger than the predetermined more threshold value when the vehicle 1 is in the power running state. Similarly, the eco mode may be a driving mode in which the ratio of the battery 31 is smaller than the predetermined more threshold value when the vehicle 1 is in the power running state.

In this case, the predetermined mode threshold value is set to any value which is capable of appropriately distinguishing the sport mode and the eco mode which satisfy (achieve or realize) the different characteristics respectively, with considering the correlation between the characteristic required for the vehicle and the ratio of each of the battery 31 and the capacitor 32.

Alternatively, the sport mode and the eco mode may not be necessarily distinguished only when the vehicle 1 is in the regeneration state, for example. For example, as illustrated in FIG. 3(*c*), the ratio of each of the battery 31 and the capacitor 32 may be fixed. Incidentally, in an example illustrated in FIG. 3(*c*), the ratio of the battery 31 is fixed to 10% and the ratio of the capacitor 32 is fixed to 90%, regardless of the result of selecting the sport mode or the eco mode. Even in this case, there is no technical problem as long as the sport mode and the eco mode can be distinguished by at least the ratio of each of the battery 31 and the capacitor 32 in the power running state.

As described above, the ECU 40 is capable of appropriately varying the ratio of each of the battery 31 and the capacitor 32 by selecting the driving mode. Namely, the ECU 40 is capable of appropriately varying the ratio of each of the battery 31 and the capacitor 32 on the basis of the characteristic required for the vehicle.

In this case, the ECU 40 may further adjust (in other words, vary) the ratio of each of the battery 31 and the capacitor 32 finely (minutely) within the range associated with the selected driving mode. For example, the ECU 40 may adjust (in other words, vary) the ratio of each of the battery 31 and the capacitor 32 finely within the range associated with the selected driving mode such that the ratio is equal to the appropriate (alternatively, optimum) ratio which can satisfy the characteristic required for the vehicle 1. Incidentally, the "characteristic" herein may include not only the characteristic (namely, the characteristic which prioritizes the fuel efficiency or the driving performance) which is related to the selection of the driving mode at the step S10 in FIG. 2 but also a characteristic which is somewhat related to the travel (driving) of the vehicle 1 (for example, a characteristic which satisfies the required electrical power, a characteristic which realizes a stable travel (stable driving) of the vehicle 1, or the like).

For example, an example in which the sport mode which can be distinguished by the ratio and which is illustrated in FIG. 3(*a*) is selected will be explained.

In this case, the ECU 40 may finely adjust the ratio of each of the battery 31 and the capacitor 32 on the basis of the priority of the fuel efficiency within the range (the range of the ratio of the battery 31 from 50% to 100% in the example illustrated in FIG. 3(*a*)) associated with the sport mode which prioritizes the driving performance. For example, the ECU 40 may finely adjust the ratio of each of the battery 31 and the capacitor 32 within the range associated with the sport mode to decrease the ratio of the battery 31 more (namely, to move the white circle point which represents the ratio toward the right side more) as the priority of the fuel efficiency is larger.

Alternatively, the ECU 40 may finely adjust the ratio of each of the battery 31 and the capacitor 32 within the range associated with the sport mode such that the adjusted ratio satisfies the required electrical power, if the current ratio is not capable of satisfying the required electrical power. Specifically, for example, the capacitor 32 is capable of performing the input/output of the capacitor power relatively rapidly, and thus it is preferable that the capacitor power which is inputted to or outputted from the capacitor 32 be temporarily used to compensate (cope with) the rapid variation of the required electrical power when the required electrical power varies rapidly due to the rapid acceleration or rapid deceleration. Therefore, the ECU 40 may finely adjust the ratio of each of the battery 31 and the capacitor 32 such that the capacitor 32 performs the input/output of the capacitor power which is capable of compensating the rapid variation of the required electrical power.

Alternatively, as described later in detail, it is preferable that the capacitor power which is inputted to or outputted from the capacitor 32 be effectively used to satisfy the driving performance. Thus, it is preferable that the depletion of the capacitor 32 be prevented when the driving performance is prioritized. Therefore, the ECU 40 may finely adjust the ratio of each of the battery 31 and the capacitor 32 within the range associated with the sport mode such that the depletion of the capacitor 32 is prevented as much as possible.

The above described selection of the driving mode (namely, the sport mode and the eco mode) and the adjustment of the ratio of each of the battery 31 and the capacitor 32 within the range associated with the selected driving mode are performed in accordance with the flowchart illustrated in FIG. 2 during the traveling (driving) of the vehicle 1. Therefore, if the characteristic required for the vehicle 1 varies, the ECU 40 is capable of varying the ratio of each of the battery 31 and the capacitor 32 to keep up with the variation of the characteristic.

As described above, the ECU 40 is capable of appropriately varying the ratio of each of the battery 31 and the capacitor 32. In other words, in the present embodiment, the ratio of each of the battery 31 and the capacitor 32 is not necessarily fixed to constant ratio. Therefore, the ECU 40 is capable of setting the ratio of each of the battery 31 and the capacitor 32 to the appropriate (alternatively, optimum) ratio based on the variation of the characteristic every time the characteristic required for the vehicle 1 varies. As a result, the ECU 40 is capable of effectively using the battery 31 and the capacitor 32 in accordance with the ratio which is set by the selection of the driving mode and the adjustment within the range associated with the selected driving mode. Therefore, the ECU 40 is capable of effectively using the battery 31 and the capacitor 32 to support the plurality of characteristics which are different from each other.

Specifically, when the sport mode is selected in the power running state, the ratio of the battery 31 is relatively large and the ratio of the capacitor 32 is relatively small, compared to the case where the eco mode is selected. In this case, the capacitor outputted power which should be outputted from the capacitor 32 becomes relatively small, and thus the capacitor 32 is not likely depleted. In other words, the depletion of the capacitor 32 is prevented when the sport mode is selected, compared to the case where the eco mode is selected. As a result, the capacity of the capacitor 32 can be reduced easily. Therefore, a cost, a size or the like of the capacitor 32 can be reduced. Moreover, a temporal output of the capacitor outputted power from the capacitor 32 is preferably used to satisfy the required outputted electrical power (namely, to compensate the battery outputted power outputted from the battery 31), when the large required outputted electrical power is temporarily needed in order to satisfy the driving performance (for example, to allow the vehicle 1 to accelerate at a relatively large acceleration rate). Thus, when the depletion of the capacitor 32 is prevented, the capacitor 32 is capable of temporarily outputting the capacitor outputted power more easily to satisfy this driving performance. In other words, such a situation does not occur easily that the capacitor 32 is not capable of outputting the capacitor outputted power at the timing when the capacitor 32 should temporarily output the capacitor outputted power in accordance with the variation of the required outputted electrical power. As a result, it is possible to satisfy the characteristic which prioritizes the driving performance for a longer time.

Similarly, when the eco mode is selected in the power running state, the ratio of the battery 31 is relatively small and the ratio of the capacitor 32 is relatively large, compared to the case where the sport mode is selected. Here, according to the characteristic of the capacitor 32, an efficiency of the input/output of the capacitor power to/from the capacitor 32 is generally better than an efficiency of the input/output of the battery power to/from the battery 31. Thus, the fuel efficiency becomes better as the ratio of the capacitor 32 becomes larger (in other words, the ratio of the battery 31 becomes smaller). Thus, when the eco mode is selected, the fuel efficiency of the vehicle 1 improves, compared to the case where the sport mode is selected.

Alternatively, in the regeneration state, the ratio of the battery 31 is relatively small and the ratio of the capacitor 32 is relatively large. Therefore, the regenerated electrical power which is generated by the regeneration of the motor generator 10 is preferentially inputted to (namely, used to charge) the capacitor 32. As a result, the capacitor 32 is not likely depleted. Therefore, when the eco mode is selected in the power running state and thus the ratio of the capacitor 32 is relatively large, it is possible to output the capacitor outputted power at a relatively large ratio, because the capacitor 32 is preferentially charged in the regeneration state. Alternatively, when the sport mode is selected in the power running state, such a situation does not occur easily that the capacitor 32 is not capable of outputting the capacitor outputted power at the timing when the capacitor 32 should temporarily output the capacitor outputted power, because the capacitor 32 is preferentially charged in the regeneration state. As described above, in the present embodiment, the capacitor 32 is preferentially charged in preparation for the traveling of the vehicle 1 in the power running state.

Moreover, as described above, the ECU 40 is capable of appropriately varying the ratio of each of the battery 31 and the capacitor 32 on the basis of the priority of the fuel efficiency or the like, even if the sport mode is selected. As a result, the vehicle 1 is capable of traveling to prioritize the driving performance the most while prioritizing the fuel efficiency to some extent. Similarly, as described above, the ECU 40 is capable of appropriately varying the ratio of each of the battery 31 and the capacitor 32 on the basis of the priority of the driving performance or the like, even if the eco mode is selected. As a result, the vehicle 1 is capable of traveling to prioritize the fuel efficiency the most while prioritizing the driving performance to some extent.

As described above, the present embodiment is capable of achieving such a very useful effect that the battery 31 and the capacitor 32 can be effectively used to support the plurality of characteristics which are different from each other.

Moreover, any driving mode, with which appropriately ratio is associated in accordance with the characteristic required for the vehicle, may be used in addition to or instead of the sport mode and the eco mode. Even in this case, the above described effect (especially, the effect that the battery 31 and the capacitor 32 can be effectively used to support the plurality of characteristics which are different from each other) can be achieved, as long as the desired driving mode is selected on the basis of the characteristic required for the vehicle as described above.

Moreover, in the above described explanation, the ECU 40 selects the driving mode on the basis of the characteristic required for the vehicle. However, the ECU 40 may directly set (alternatively, adjust) the ratio of each of the battery 31 and the capacitor 32 on the basis of the characteristic required for the vehicle, in addition to or instead of selecting the driving mode. Even in this case, the above described effect (especially, the effect that the battery 31 and the capacitor 32 can be effectively used to support the plurality of characteristics which are different from each other) can be achieved.

Incidentally, a performance of the battery 31 depends on a temperature (namely, a current temperature) of the battery 31. Specifically, as illustrated in FIG. 5(a), when the temperature of the battery 31 is close to a rated limit temperature (namely, an allowable lower limit temperature and an allowable upper limit temperature) which is determined by the specification of the battery 31, the performance of the battery 31 deteriorates more as a difference between the temperature of the battery 31 and the rated limit temperature becomes smaller. Namely, when the temperature of the battery 31 is close to the rated limit temperature, there is higher possibility that the battery 31 is not capable of performing a stable or desired operation as the difference between the temperature of the battery 31 and the rated limit temperature becomes smaller.

Similarly, a performance of the capacitor 32 also depends on a temperature of the capacitor 32. Specifically, as illustrated in FIG. 5(b), when the temperature of the capacitor 32 is close to a rated limit temperature (namely, an allowable lower limit temperature and an allowable upper limit temperature) which is determined by the specification of the capacitor 32, the performance of the capacitor 32 deteriorates more as a difference between the temperature of the capacitor 32 and the rated limit temperature becomes smaller. Namely, when the temperature of the capacitor 32 is close to the rated limit temperature, there is higher possibility that the capacitor 32 is not capable of performing a stable or desired operation as the difference between the temperature of the capacitor 32 and the rated limit temperature becomes smaller.

Here, when at least one of the battery and the capacitor 32 is not capable of performing the stable or desired operation, there is a possibility that the characteristic which prioritizes the driving performance cannot be satisfied even if the sport mode is selected. Thus, in the present embodiment, the ECU 40 may prohibits the selection of the sport mode, when at least one of the battery and the capacitor 32 is not capable of performing the stable or desired operation.

Specifically, for example, the ECU 40 may determine that the battery 31 is not capable of performing the stable or desired operation, when the difference between the temperature of the battery 31 and the allowable lower limit temperature is smaller than a predetermined threshold value th21. Similarly, the ECU 40 may determine that the battery 31 is not capable of performing the stable or desired operation, when the difference between the temperature of the battery 31 and the allowable upper limit temperature is smaller than a predetermined threshold value th22. Similarly, the ECU 40 may determine that the capacitor 32 is not capable of performing the stable or desired operation, when the difference between the temperature of the capacitor 32 and the allowable lower limit temperature is smaller than a predetermined threshold value th23. Similarly, the ECU 40 may determine that the capacitor 32 is not capable of performing the stable or desired operation, when the difference between the temperature of the capacitor 32 and the allowable upper limit temperature is smaller than a predetermined threshold value th24. Therefore, this determination may allow the ECU 40 to prohibit the selection of the sport mode.

Incidentally, each of the predetermined threshold values th21 and th22 is preferably set to any value which is capable of distinguishing a state that the battery 31 is capable of performing the input/output of the battery power which satisfies the driving performance and a state that the battery 31 is not capable of performing the input/output of the battery power which satisfies the driving performance, with considering the specification of the battery 31.

Similarly, each of the predetermined threshold values th23 and th24 is preferably set to any value which is capable of distinguishing a state that the capacitor 32 is capable of performing the input/output of the capacitor power which satisfies the driving performance and a state that the capacitor 32 is not capable of performing the input/output of the capacitor power which satisfies the driving performance, with considering the specification of the capacitor 32.

(3) Modified Example of Operation of Varying Ratios of Battery and Capacitor

Next, with reference to FIG. 6 and FIG. 7, modified examples of the control operation of the vehicle 1 in the present embodiment (substantially, the control operation of the electrical source system 30, and the operation of varying the ratio of each of the battery 31 and the capacitor 32) will be explained.

(3-1) First Modified Example

Firstly, with reference to FIG. 6, a first modified example of the control operation of the vehicle 1 in the present embodiment (substantially, the control operation of the electrical source system 30, and the operation of varying the ratio of each of the battery 31 and the capacitor 32) will be explained. FIG. 6 are graphs each of which conceptually illustrates an aspect of adjusting the ratio of each of the battery 31 and the capacitor 32 on the basis of a SOC (State Of Charge) of the capacitor 32.

In the first modified example, the ECU 40 additionally adjusts the ratio of each of the battery 31 and the capacitor 32 on the basis of the SOC (namely, the current SOC) of the capacitor 32.

Specifically, as illustrated in FIG. 6(a), when the vehicle 1 is in the regeneration state, the ECU 40 preferably adjusts the ratio of each of the battery 31 and the capacitor 32 such that the ratio of the capacitor 32 becomes smaller as a difference between the SOC of the capacitor 32 and a rated limit value of the SOC (specifically, an upper limit SOC which corresponds to an upper limit value of the SOC of the capacitor 32) becomes smaller. In this case, the ECU 40 preferably adjusts the ratio of each of the battery 31 and capacitor 32 on the basis of the difference between the SOC of the capacitor 32 and the upper SOC, when the difference between the SOC of the capacitor 32 and the upper SOC is smaller than a predetermined threshold value th25. As a result, as illustrated in FIG. 6(b), the ratio of the capacitor 32 becomes smaller and the ratio of the battery 31 becomes larger than those before the adjustment.

Here, as illustrated in FIG. 6(b), it is assumed that the above described eco mode is selected, the ratio of the battery 31 is set to 0% (alternatively, a value which is close to 0%) and the ratio of the capacitor 32 is set to 100% (alternatively, a value which is close to 100%). In this condition, it is presumed that a remaining space of the capacitor 32 for the charge (namely, the input of the capacitor inputted power) is smaller as the difference between the SOC of the capacitor 32 and the upper SOC is smaller. Therefore, in this case, the adjustment of the ratio of each of the battery 31 and the capacitor 32 on the basis of the difference between the SOC of the capacitor 32 and the upper SOC allows the regenerated electrical power which cannot be inputted to (cannot charge) the capacitor 32 to be inputted to the battery 31. Therefore, the waste of the regenerated electrical power is prevented and thus the fuel efficiency improves.

Alternatively, as illustrated in FIG. 6(c), when the vehicle 1 is in the power running state, the ECU 40 preferably adjusts the ratio of each of the battery 31 and the capacitor 32 such that the ratio of the capacitor 32 becomes smaller as a difference between the SOC of the capacitor 32 and a rated limit value of the SOC (specifically, a lower limit SOC which corresponds to an lower limit value of the SOC of the capacitor 32) becomes smaller. In this case, the ECU 40 preferably adjusts the ratio of each of the battery 31 and capacitor 32 on the basis of the difference between the SOC of the capacitor 32 and the lower SOC, when the difference between the SOC of the capacitor 32 and the lower SOC is smaller than a predetermined threshold value th26. As a result, as illustrated in FIG. 6(d), the ratio of the capacitor 32 becomes smaller and the ratio of the battery 31 becomes larger than those before the adjustment.

Here, as illustrated in FIG. 6(d), it is assumed that the above described eco mode is selected, the ratio of the battery 31 is set to 0% (alternatively, a value which is close to 0%) and the ratio of the capacitor 32 is set to 100% (alternatively, a value which is close to 100%). In this condition, it is presumed that the capacitor 32 depletes more easily as the difference between the SOC of the capacitor 32 and the lower SOC is smaller. Therefore, in this case, the adjustment of the ratio of each of the battery 31 and the capacitor 32 on the basis of the difference between the SOC of the capacitor 32 and the lower SOC is capable of preventing the capacitor 32 from depleting.

Figure 6:
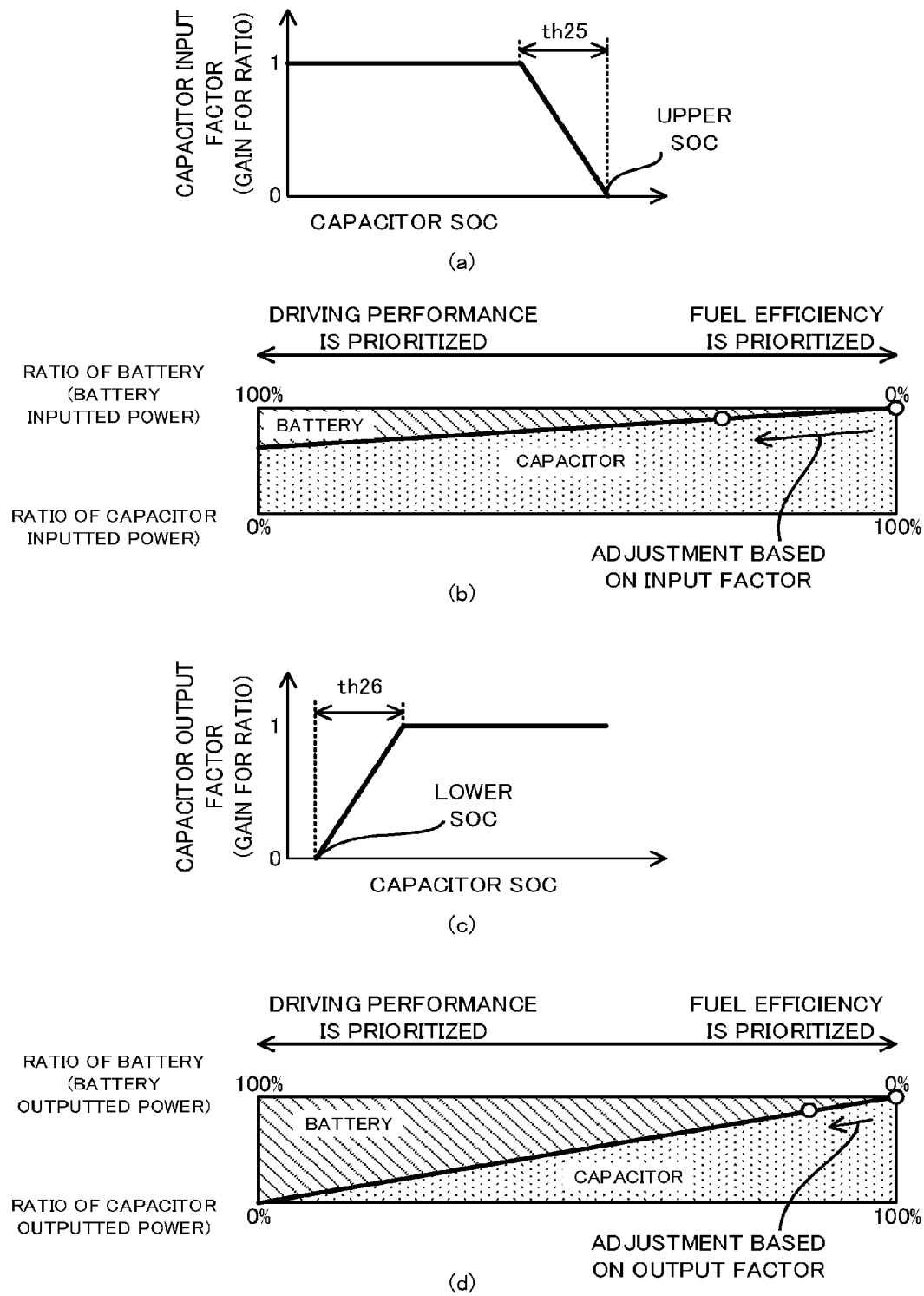
FIG. 6 are graphs each of which conceptually illustrates an aspect of adjusting the ratio of each of the battery and the capacitor on the basis of a SOC (State Of Charge) of the capacitor.

Incidentally, FIG. 6 illustrate the operation of adjusting the ratio of each of the battery 31 and the capacitor 32 on the basis of the SOC of the capacitor 32. However, the ECU 40 may adjust the ratio of each of the battery 31 and the capacitor 32 on the basis of the SOC of the battery 31, in addition to or instead of adjusting the ratio of each of the battery 31 and the capacitor 32 on the basis of the SOC of the capacitor 32. Namely, the ECU 40 may adjust the ratio of each of the battery 31 and the capacitor 32 on the basis of the SOC of the battery 31 in a same manner of the operation of adjusting the ratio of each of the battery 31 and the capacitor 32 on the basis of the SOC of the capacitor 32.

(2-2) Second Modified Example

Next, with reference to FIG. 7, a second modified example of the control operation of the vehicle 1 in the present embodiment (substantially, the control operation of the electrical source system 30, and the operation of varying the ratio of each of the battery 31 and the capacitor 32) will be explained. FIG. 7 are graphs each of which conceptually illustrates an aspect of adjusting the ratio of each of the battery 31 and the capacitor 32 on the basis of a temperature of the battery 31.

In the second modified example, the ECU 40 additionally adjusts the ratio of each of the battery 31 and the capacitor 32 on the basis of the temperature (namely, the current temperature) of the battery 31.

Specifically, as illustrated in FIG. 7(a), the ECU 40 preferably adjusts the ratio of each of the battery 31 and the capacitor 32 such that the ratio of the battery 31 becomes smaller as a difference between the current temperature of the battery 31 and the rated limit temperature (namely, the allowable lower limit temperature or allowable upper limit temperature) becomes smaller. In this case, the ECU 40 preferably adjusts the ratio of each of the battery 31 and capacitor 32 on the basis of the temperature of the battery 31, when the difference between the temperature of the battery 31 and the allowable lower limit temperature is smaller than a predetermined threshold value th27. Alternatively, the ECU 40 preferably adjusts the ratio of each of the battery 31 and capacitor 32 on the basis of the temperature of the battery 31, when the difference between the temperature of the battery 31 and the allowable upper limit temperature is smaller than a predetermined threshold value th28. As a result, as illustrated in FIG. 7(b) and FIG. 7(c), the ratio of the battery 31 becomes smaller and the ratio of the capacitor 32 becomes larger than those before the adjustment.

Here, as illustrated in FIG. 7(b), it is assumed that the above described sport mode is selected, the ratio of the battery 31 in the power running state is set to 100% (alternatively, a value which is close to 100%) and the ratio of the capacitor 32 in the power running state is set to 0% (alternatively, a value which is close to 0%). In this condition, there is a higher possibility that the battery 31 is not capable of performing the stable or desired operation as the difference between the temperature of the battery 31 and the rated limit temperature is smaller. Namely, there is a higher possibility that the required outputted electrical power is not satisfied by the battery outputted power which is outputted from the battery 31. Therefore, in this case, the adjustment of the ratio of each of the battery 31 and the capacitor 32 on the basis of the difference between the temperature of the battery 31 and the rated limit temperature allows the capacitor 32 to compensate the shortage of the battery outputted power which is outputted from the battery 31. Therefore, the vehicle 1 is capable of traveling in a stable manner even when the temperature of the battery 31 is close to the rated limit temperature.

Similarly, as illustrated in FIG. 7(c), it is assumed that the above described sport mode is selected, the ratio of the battery 31 in the regeneration state is set to 30% (alternatively, a value which is close to 30%) and the ratio of the capacitor 32 in the regeneration state is set to 70% (alternatively, a value which is close to 70%). In this condition, there is a higher possibility that the battery 31 is not capable of performing the stable or desired operation as the difference between the temperature of the battery 31 and the rated limit temperature is smaller. Namely, there is a higher possibility that the regenerated electrical power cannot be inputted to the battery 31. Therefore, in this case, the adjustment of the ratio of each of the battery 31 and the capacitor 32 on the basis of the difference between the temperature of the battery 31 and the rated limit temperature allows the excess of the regenerated electrical power which cannot be inputted to the battery 31 to be inputted to the capacitor 32. Therefore, the waste of the regenerated electrical power is prevented and thus the fuel efficiency improves even when the temperature of the battery 31 is close to the rated limit temperature.

Figure 7:
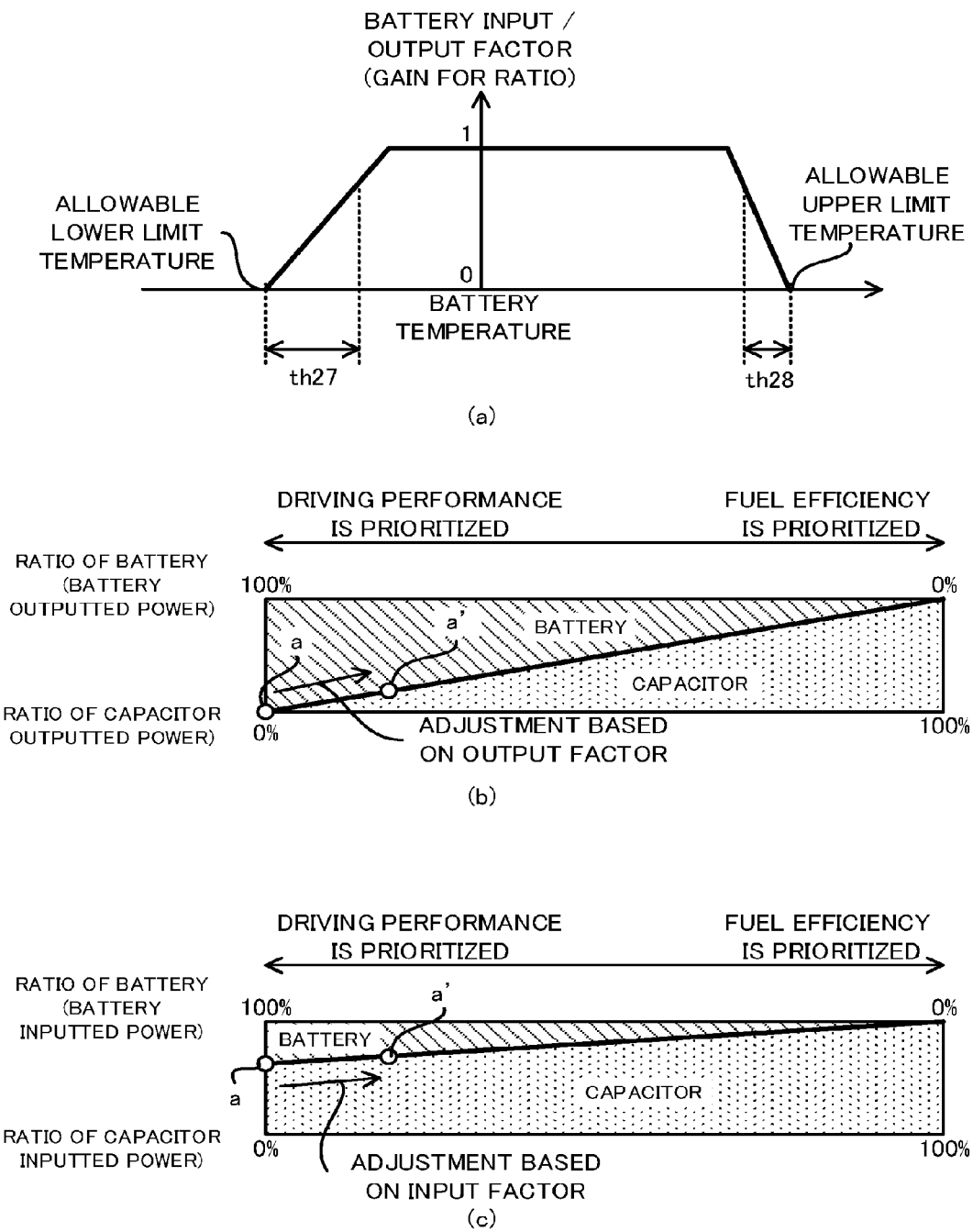
FIG. 7 are graphs each of which conceptually illustrates an aspect of adjusting the ratio of each of the battery and the capacitor on the basis of a temperature of the battery.

Incidentally, FIG. 7 illustrate the operation of adjusting the ratio of each of the battery 31 and the capacitor 32 on the basis of the temperature of the battery 31. However, the ECU 40 may adjust the ratio of each of the battery 31 and the capacitor 32 on the basis of the temperature of the capacitor 32, in addition to or instead of adjusting the ratio of each of the battery 31 and the capacitor 32 on the basis of the temperature of the battery 31. Namely, the ECU 40 may adjust the ratio of each of the battery 31 and the capacitor 32 on the basis of the temperature of the capacitor 32 in a same manner of the operation of adjusting the ratio of each of the battery 31 and the capacitor 32 on the basis of the temperature of the battery 31.

The present invention can be changed, if desired, without departing from the essence or spirit of the invention which can be read from the claims and the entire specification. An electrical source control apparatus, which involves such changes, is also intended to be within the technical scope of the present invention.

DESCRIPTION OF REFERENCE CODES 1 vehicle
10 motor generator
21 axle shaft
22 wheel
30 electrical source system
31 battery
32 capacitor
33 electrical power converter
34 smoothing condenser
35 inverter
40 ECU

The invention claimed is:

1. An electrical source control apparatus for controlling a vehicle which travels by using an electrical source system including both of first and second electrical sources,
the first electrical source performing an input/output of a first electrical power,
the second electrical source performing an input/output of a second electrical power, a capacity of the second electrical source being smaller than that of the first electrical source and an output of the second electrical source being larger than that of the first electrical source,
the electrical source control apparatus comprising a controller,
the controller being programmed to:
select a first driving mode which prioritizes a fuel efficiency over a driving performance and a second driving mode which prioritizes the driving performance over the fuel efficiency on the basis of a characteristic which is required for the vehicle from a plurality of driving modes, each driving mode being associated with a ratio of the first electrical power with respect to a required electrical power which is required for the electrical source system, the ratios in the plurality of driving modes being different from each other; and
control the first and second electrical sources such that the input/output of the first and second electrical powers are performed in accordance with the ratio of the selected first or second driving mode.

2. The electrical source control apparatus according to claim 1, wherein
the first driving mode is a driving mode in which the ratio of the first electrical power is less than a first threshold value and the second driving mode is a driving mode in which the ratio of the first electrical power is more than the first threshold value.

3. The electrical source control apparatus according to claim 1 wherein
the first driving mode is a driving mode in which the ratio of the first electrical power is less than a ratio of the second electrical power with respect to the required electrical power and the second driving mode is a driving mode in which the ratio of the first electrical power is more than the ratio of the second electrical power.

4. The electrical source control apparatus according to claim 1, wherein
the controller is programmed to select the first driving mode, when the characteristic which is required for the vehicle is a characteristic which prioritizes the fuel efficiency over the driving performance,
the controller is programmed to select the second driving mode, when the characteristic which is required for the vehicle is a characteristic which prioritizes the driving performance over the fuel efficiency.

5. The electrical source control apparatus according to claim 4, wherein
the controller is programmed not to select the second driving mode, when a difference between a current value of the characteristic of at least one of the first and second electrical sources and a rated limit value of at least one of the first and second electrical sources is less than a second threshold value, even when the characteristic which is required for the vehicle is the characteristic which prioritizes the driving performance over the fuel efficiency.

6. The electrical source control apparatus according to claim 1, wherein
the controller is programmed to adjust the ratio of the first electrical power on the basis of a difference between a current value of the characteristic of at least one of the first and second electrical sources and a rated limit value of at least one of the first and second electrical sources.

7. The electrical source control apparatus according to claim 6, wherein
the controller is programmed to decrease the ratio of the first electrical power more as the difference between the current value of the characteristic of the first electrical source and the rated limit value of the first electrical source becomes smaller.

8. The electrical source control apparatus according to claim 6, wherein
the controller is programmed to increase the ratio of the first electrical power more as the difference between the current value of the characteristic of the second electrical source and the rated limit value of the second electrical source becomes smaller.

9. An electrical source control apparatus for controlling a vehicle which travels by using an electrical source system including both of first and second electrical sources,
the first electrical source performing an input/output of a first electrical power,
the second electrical source performing an input/output of a second electrical power, a capacity of the second electrical source being smaller than that of the first electrical source and an output of the second electrical source being larger than that of the first electrical source,
the electrical source control apparatus comprising a controller
the controller being programmed to:
dynamically adjust a ratio of the first electrical power with respect to a required electrical power which is required for the electrical source system on the basis of a characteristic which is required for the vehicle such that the adjusted ratio of the first electrical power is a first ratio which prioritizes a fuel efficiency over a driving performance and a second ratio which prioritizes the driving performance over the fuel efficiency; and
control the first and second electrical sources such that the input/output of the first and second electrical powers are performed in accordance with the adjusted ratio.

10. The electrical source control apparatus according to claim 9, wherein
the controller is programmed to (i) adjust the ratio of the first electrical power such that the ratio of the first electrical power is the first ratio which is less than a first threshold value, when the characteristic which is required for the vehicle is a characteristic which prioritizes the fuel efficiency over the driving performance, and (ii) adjust the ratio of the first electrical power such that the ratio of the first electrical power is the second ratio which is more than the first threshold value, when the characteristic which is required for the vehicle is a characteristic which prioritizes the driving performance over the fuel efficiency.

11. The electrical source control apparatus according to claim 9, wherein
the controller is programmed to (i) adjust the ratio of the first electrical power such that the ratio of the first electrical power is the first ratio which is less than a ratio of the second electrical power with respect to the required electrical power, when the characteristic which is required for the vehicle is a characteristic which prioritizes the fuel efficiency over the driving performance, and (ii) adjust the ratio of the first electrical power such that the ratio of the first electrical power is the second ratio which is more than the ratio of the second electrical power, when the characteristic which is required for the vehicle is a characteristic which prioritizes the driving performance over the fuel efficiency.

12. The electrical source control apparatus according to claim 10, wherein
the controller is programmed not to adjust the ratio of the first electrical power such that the ratio of the first electrical power is the second ratio which is more than the first threshold value, when a difference between a current value of the characteristic of at least one of the first and second electrical sources and a rated limit value of at least one of the first and second electrical sources is less than a second threshold value, even when the characteristic which is required for the vehicle is the characteristic which prioritizes the driving performance over the fuel efficiency.

13. The electrical source control apparatus according to claim 11, wherein
the controller is programmed not to adjust the ratio of the first electrical power such that the ratio of the first electrical power is the second ratio which is more than the ratio of the second electrical power, when a difference between a current value of the characteristic of at least one of the first and second electrical sources and a rated limit value of at least one of the first and second electrical sources is less than a second threshold value, even when the characteristic which is required for the vehicle is the characteristic which prioritizes the driving performance over the fuel efficiency.

14. The electrical source control apparatus according to claim 9, wherein
the controller is programmed to further adjust the ratio of the first electrical power on the basis of a difference between a current value of the characteristic of at least one of the first and second electrical sources and a rated limit value of at least one of the first and second electrical sources.

15. The electrical source control apparatus according to claim 14, wherein
the controller is programmed to decrease the ratio of the first electrical power more as the difference between the current value of the characteristic of the first electrical source and the rated limit value of the first electrical source becomes smaller.

16. The electrical source control apparatus according to claim 14, wherein
the controller is programmed to increase the ratio of the first electrical power more as the difference between the current value of the characteristic of the second electrical source and the rated limit value of the second electrical source becomes smaller.

* * * * *